(12) United States Patent
Yuan et al.

(10) Patent No.: US 12,395,778 B2
(45) Date of Patent: *Aug. 19, 2025

(54) SENSOR DEVICE

(71) Applicant: SHENZHEN SHOKZ CO., LTD., Guangdong (CN)

(72) Inventors: Yongshuai Yuan, Shenzhen (CN); Wenjun Deng, Shenzhen (CN); Wenbing Zhou, Shenzhen (CN); Yujia Huang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 244 days.

This patent is subject to a terminal disclaimer.

(21) Appl. No.: 18/351,480

(22) Filed: Jul. 12, 2023

(65) Prior Publication Data
US 2023/0362524 A1 Nov. 9, 2023

Related U.S. Application Data

(63) Continuation of application No. PCT/CN2021/112030, filed on Aug. 11, 2021.

(30) Foreign Application Priority Data

Apr. 23, 2021 (CN) .......................... 202110445739.3

(51) Int. Cl.
*H04R 1/22* (2006.01)
*G01H 11/08* (2006.01)
(Continued)

(52) U.S. Cl.
CPC ............. *H04R 1/222* (2013.01); *G01H 11/08* (2013.01); *G01N 29/036* (2013.01);
(Continued)

(58) Field of Classification Search
CPC . H04R 1/222; H04R 1/08; H04R 1/20; H04R 17/02; H04R 17/10; H04R 19/04;
(Continued)

(56) References Cited

U.S. PATENT DOCUMENTS

2006/0197411 A1 9/2006 Hoen et al.
2016/0142829 A1 5/2016 Berger et al.
(Continued)

FOREIGN PATENT DOCUMENTS

CN 209526861 U 10/2019
CN 111510834 A 8/2020
(Continued)

OTHER PUBLICATIONS

International Search Report in PCT/CN2021/112030 mailed on Jan. 13, 2022, 7 pages.

*Primary Examiner* — Tuan D Nguyen
(74) *Attorney, Agent, or Firm* — Metis IP LLC

(57) ABSTRACT

The embodiments of the present disclosure provide a sensor device, including: a sensor assembly with a first resonant frequency and a sound pickup assembly configured to communicate with an external sound of the sensor device through a sound inlet, wherein an acoustic cavity may be formed between the sound pickup assembly and the sensor assembly, when the sound pickup assembly vibrates in response to an air conduction sound transmitted through the sound inlet, vibrations of the sound pickup assembly may change a sound pressure in the acoustic cavity, and the sensor assembly may convert the air conduction sound into an electrical signal based on changes of the sound pressure in the acoustic cavity, wherein the sound pickup assembly may provide the sensor device with a second resonant (Continued)

frequency, and a difference between the second resonant frequency and the first resonant frequency may be in a range of 1000 Hz-10000 Hz.

20 Claims, 10 Drawing Sheets

(51) Int. Cl.
| | |
|---|---|
| *G01N 29/036* | (2006.01) |
| *G01N 29/24* | (2006.01) |
| *G01P 1/02* | (2006.01) |
| *H04R 1/08* | (2006.01) |
| *H04R 1/20* | (2006.01) |
| *H04R 17/02* | (2006.01) |
| *H04R 17/10* | (2006.01) |
| *H04R 19/04* | (2006.01) |

(52) U.S. Cl.
CPC ..... *G01N 29/2406* (2013.01); *G01N 29/2437* (2013.01); *G01P 1/023* (2013.01); *H04R 1/08* (2013.01); *H04R 1/20* (2013.01); *H04R 17/02* (2013.01); *H04R 17/10* (2013.01); *H04R 19/04* (2013.01); *G01N 2291/014* (2013.01); *G01N 2291/022* (2013.01)

(58) Field of Classification Search
CPC ........ H04R 1/083; G01H 11/08; G01H 11/00; G01N 29/036; G01N 29/2406; G01N 29/2437; G01N 2291/014; G01N 2291/022; G01P 15/097; G01P 15/0802; G01P 15/09; G01P 15/125; G01P 1/023
See application file for complete search history.

(56) References Cited

U.S. PATENT DOCUMENTS

| | | |
|---|---|---|
| 2017/0111731 A1 | 4/2017 | Merks-Swolfs |
| 2020/0404412 A1 | 12/2020 | Akiyama et al. |
| 2021/0051416 A1 | 2/2021 | Masters et al. |

FOREIGN PATENT DOCUMENTS

| | | |
|---|---|---|
| CN | 111741418 A | 10/2020 |
| CN | 211630374 U | 10/2020 |
| CN | 112565995 A | 3/2021 |
| CN | 112601169 A | 4/2021 |

SENSOR DEVICE

CROSS-REFERENCE TO RELATED APPLICATION

This application is a continuation of International Application No. PCT/CN2021/112030, filed on Aug. 11, 2021, which is a continuation of Chinese application No. 202110445739.3 filed on Apr. 23, 2021, the contents of which are entirely incorporated herein by reference.

TECHNICAL FIELD

The present disclosure relates to the field of acoustic technology, and in particular, to a sensor device.

BACKGROUND

A sensor device (e.g., a microphone) receives an external vibration signal. Near a resonant frequency of the sensor device, the vibration signal may generate a greater amplitude due to a resonant effect. However, at a non-resonant frequency of the sensor device, the amplitude of the vibration signal is relatively small, so that the sensor device may only have a higher sensitivity in a narrow frequency range. Therefore, it is desirable to provide a sensor device with a higher sensitivity in a wider frequency range.

SUMMARY

The embodiments of the present disclosure provide a sensor device, including: a sensor assembly with a first resonant frequency and a sound pickup assembly configured to communicate with an external sound of the sensor device through a sound inlet, wherein an acoustic cavity may be formed between the sound pickup assembly and the sensor assembly, when the sound pickup assembly vibrates in response to an air conduction sound transmitted through the sound inlet, vibrations of the sound pickup assembly may change a sound pressure in the acoustic cavity, and the sensor assembly may convert the air conduction sound into an electrical signal based on changes of the sound pressure in the acoustic cavity, wherein the sound pickup assembly may provide the sensor device with a second resonant frequency, and a difference between the second resonant frequency and the first resonant frequency may be in a range of 1000 Hz-10000 Hz.

In some embodiments, the sound pickup assembly may include a liquid or a gel; and the liquid or the gel and a gas in the acoustic cavity may form a resonant system with the second resonant frequency.

In some embodiments, the sound pickup assembly may further include a supporting component configured to limit a movement of the liquid or the gel.

In some embodiments, the supporting component may include a pipe column connected to or in contact with the sensor assembly; and the pipe column may include a straight pipe column or a curved pipe column.

In some embodiments, the sensor assembly may include a printed circuit board; and the sound pickup assembly may include a diaphragm connected to the printed circuit board.

In some embodiments, the sound pickup assembly may include a diaphragm, a liquid, and a supporting component, or may include the diaphragm, a gel, and the supporting component; the liquid and the diaphragm may form a resonant system with the second resonant frequency, or the gel and the diaphragm may form the resonant system with the second resonant frequency; and the diaphragm and the supporting component may be configured to limit a movement of the liquid or the gel.

In some embodiments, the sound pickup assembly may include a diaphragm and a liquid, or may include the diaphragm and a gel; and the liquid and the diaphragm may form a resonant system with the second resonant frequency, or the gel and the diaphragm may form the resonant system with the second resonant frequency.

In some embodiments, the sound pickup assembly may include a diaphragm, a liquid, a supporting component, and a mass block, or may include the diaphragm, a gel, the supporting component, and the mass block; the liquid, the diaphragm, and the mass blcok may form a resonant system with the second resonant frequency, or the gel, the diaphragm, and the mass block may form the resonant system with the second resonant frequency; the diaphragm and the supporting component may be configured to limit a movement of the liquid or the gel; and the mass block may be placed in the liquid or the gel.

In some embodiments, the sound pickup assembly may include a diaphragm, a supporting component, and a mass block; the diaphragm and the mass block may form a resonant system with the second resonant frequency; and the supporting component may be configured to support the diaphragm and the mass block.

In some embodiments, a modulus of the diaphragm may be 100 MPa-300 GPa.

In some embodiments, a modulus of the diaphragm may be 5 GPa-50 GPa.

In some embodiments, the sensor assembly may include a second diaphragm; and a modulus of the diaphragm may be 1/100-1/10 of a modulus of the second diaphragm.

In some embodiments, the diaphragm may be circular; and a radius of the diaphragm may be 500 um-3 mm.

In some embodiments, a density of the liquid may be 0 g/cm3-3 g/cm3.

In some embodiments, a viscosity of the liquid may be 1 cst-3000 cst.

In some embodiments, the second resonant frequency may be lower than the first resonant frequency.

In some embodiments, the second resonant frequency may be 2000 Hz-10000 Hz.

Additional features will be set forth in portion in the description which follows and will become apparent to those skilled in the art upon examination of the following contents and accompanying drawings, or may be learned by production or operation of the examples. The features of the present disclosure may be implemented and obtained by practicing or using various aspects of the methods, means and combinations set forth in the following detailed examples.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments, the same numbers refer to the same structures, wherein.

DETAILED DESCRIPTION

Figure 1:
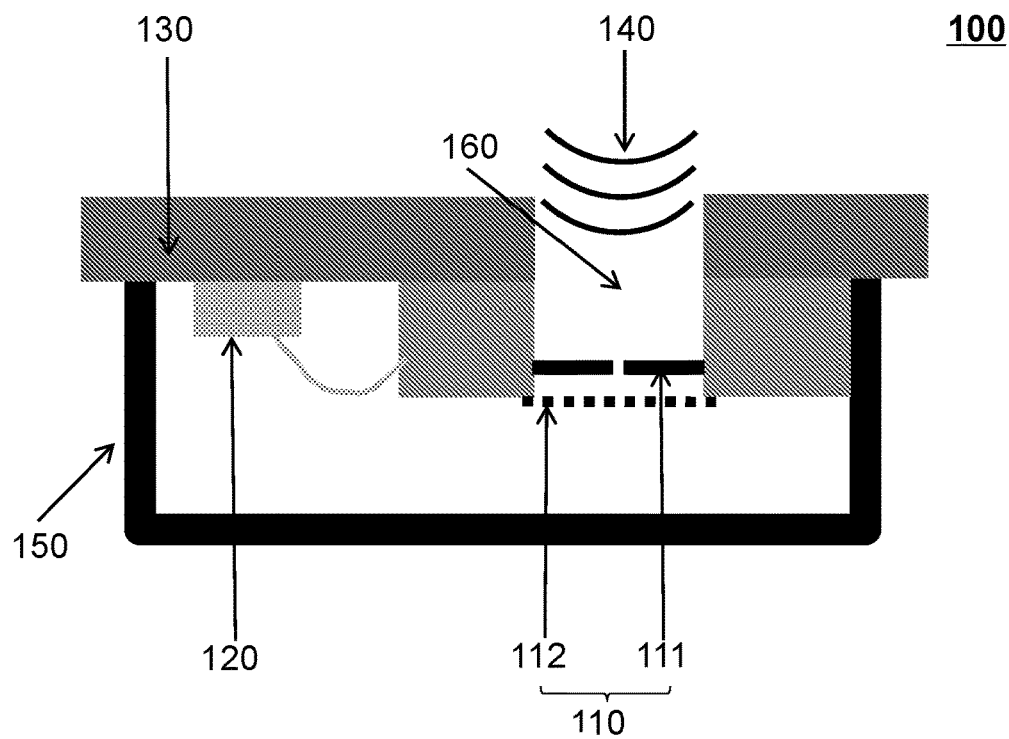
FIG. 1 is a schematic diagram illustrating a structure of a condenser air conduction microphone according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, and those skilled in the art may further apply the present disclosure to other similar scenarios. It should be understood that these exemplary embodiments are given only to enable those skilled in the art to better understand and implement the present disclosure, but not to limit the scope of the present disclosure in any way. Unless otherwise apparent from context or otherwise indicated, the same reference numerals in the figures represent the same structures or operations.

As indicated in the present disclosure and claims, the terms "a," "one," "an" and/or "the" are not specific to the singular and may include the plural unless the context clearly indicates an exception. Generally speaking, the terms "comprising" and "including" only suggest the inclusion of clearly identified operations and elements, and these operations and elements do not constitute an exclusive list, and the method or device may further contain other operations or elements. The term "based on" means "based at least in part on." The term "one embodiment" means "at least one embodiment." The term "another embodiment" means "at least one further embodiment."

In the description of the present disclosure, it should be understood that the orientation or positional relationship indicated by the terms "center," "longitudinal," "transverse," "length," "width," "height," "thickness," "upper," "lower," "front," "back," "left," "right," "vertical," "perpendicular," "horizontal," "top," "bottom," "inner," "outer," "clockwise," "counterclockwise," "axial," "radial," and "circumferential" are based on the orientation or positional relationship shown in the drawings, and are only for the convenience of describing the present disclosure and simplifying the description, rather than indicating or implying that a referenced device or element must be constructed with a particular orientation, and operated in a particular orientation. Therefore, the terms may not be regarded as limiting the present disclosure.

In addition, the terms "first" and "second" are used for descriptive purposes only, and cannot be interpreted as indicating or implying relative importance or implicitly specifying the quantity of indicated technical features. Thus, the features defined as "first" and "second" may explicitly or implicitly include at least one of these features. In the description of the present disclosure, "plurality" means at least two, such as two, three, etc., unless otherwise specifically defined.

In the present disclosure, unless otherwise clearly specified and limited, the terms "mounted," "attached," "connected," "fixed," and other terms should be interpreted in a broad sense, for example, a connection may be a fixed connection or a detachable connection, or integrated; the connection may be a mechanically or electrically connection; the connection may be a direct connection, or an indirect connection through an intermediary, or an internal communication between two elements or an interaction relationship between two elements, unless otherwise clearly defined. Those skilled in the art may understand the specific meanings of the above terms in the present disclosure according to specific situations.

In the present disclosure, unless otherwise clearly stated and limited, a first feature being "on" or "under" a second feature may mean that the first and second features are in direct contact, or that the first and second features are indirectly contacted through an intermediary. Moreover, the first feature being "above," "upside," and "over" the second feature may mean that the first feature is directly above or obliquely above the second feature, or simply means that the first feature is higher in level than the second feature. The first feature being "below," "beneath," and "under" may mean that the first feature is directly below or obliquely below the second feature, or simply means that the first feature is lower in level than the second feature.

Some embodiments of the present disclosure provide a sensor device. The sensor device may include a sensor assembly and a sound pickup assembly. The sensor assembly has a first resonant frequency. The sound pickup assembly may communicate with an external sound of the sensor device (such as an air conduction sound) through a sound inlet and form an acoustic cavity with the sensor assembly. When the sound pickup assembly vibrates in response to an air conduction sound transmitted through the sound inlet, the vibration changes a sound pressure in the acoustic cavity. The sensor assembly converts the air conduction sound into an electrical signal based on the change of the sound pressure in the acoustic cavity. The sound pickup assembly may provide the sensor device with a second resonant frequency. In some embodiments, the second resonant frequency is less than the first resonant frequency. When a difference between the second resonant frequency and the first resonant frequency satisfies a certain condition, for example, between 1000 Hz and 10000 Hz, a sensitivity of the sensor device with the sound pickup assembly may be improved in a wider frequency range than the sensor assembly.

In some embodiments, the sound pickup assembly may include a liquid, a gel, a supporting component (e.g., a column), a diaphragm (e.g., a polymer film), a mass block, etc., or any combination thereof. The liquid, the gel, or the mass block, together with gas in the above-mentioned acoustic cavity, may form a resonant system (e.g., a spring-mass system) having the above-mentioned second resonant frequency; or the liquid, the gel, or the mass block, together with the diaphragm, may form a resonant system (e.g., a spring-mass system) having the above-mentioned second resonant frequency. The supporting component may be configured to limit a movement of the liquid, the gels, the diaphragm, or the mass block. In some embodiments, by adjusting parameters (e.g., a viscosity of the liquid or the gel, a density of the liquid or the gel, a modulus of the diaphragm, a size of the diaphragm, a weight of the mass block, etc.) of a substance forming the sound pickup assembly, the magnitude of the second resonant frequency and a magnitude relationship between the first resonant frequency and the second resonant frequency may be adjusted, so as to, for example, improve the sensitivity and reliability of the sensor device or make an output gain of the sensor device more stable in a desired frequency band (e.g., a middle and low frequency) and the frequency response curve of the sensor device flatter, etc.

In some embodiments, the sensor assembly may include a base structure and a laminated structure. In some embodiments, the base structure may be a regular or irregular three-dimensional (3D) structure with a hollow portion inside. For example, the base structure may be a hollow frame structure, but not limited to regular shapes such as a rectangular frame, a circular frame, and a regular polygonal frame, as well as any irregular shapes. The laminated structure may be located in the hollow portion of the base structure or at least partially suspended above the hollow portion of the base structure. In some embodiments, at least a portion of the laminated structure is physically connected to the base structure. For example, the laminated structure may include a cantilever beam. The cantilever beam may be a plate-like structure. One end of the cantilever beam is connected to an upper surface, a lower surface of the base structure, or a side wall of the base structure where the hollow portion is located, and the other end of the cantilever beam is not connected with or not contacts the base structure such that the other end of the cantilever beam is suspended in the hollow portion of the base structure. As another example, the laminated structure may include a diaphragm layer (also referred to as a suspension film structure), the suspension film structure is fixedly connected to the base structure, and the laminated structure is disposed on the upper surface or the lower surface of the suspension film structure. As another example, the laminated structure may include a mass element (such as a mass block) and a supporting arm, the mass element is fixedly connected to the base structure through the supporting arm, one end of the supporting arm is connected to the base structure, and the other end of the supporting arm is connected to the mass element, so that the mass element and a portion of the supporting arm are suspended in the hollow portion of the base structure. It should be noted that "located in the hollow portion of the base structure" or "suspended in the hollow portion of the base structure" mentioned in the present disclosure may mean suspended in, below, or above the hollow portion of the base structure.

In some embodiments, the laminated structure may include a vibration unit and an acoustic transducer unit. Specifically, the base structure may generate a vibration based on an external vibration signal, and the vibration unit deforms in response to the vibration of the base structure. The acoustic transduction unit generates an electrical signal based on the deformation of the vibration unit. It should be noted that the description of the vibration unit and the acoustic transducer unit here is only to conveniently introduce a working principle of the laminated structure, and does not limit the actual composition and structure of the laminated structure. In fact, the vibration unit may not be necessary, and the function of the vibration unit may be completely implemented by the acoustic transducer unit. For example, after certain changes are made to the structure of the acoustic transducer unit, the acoustic transducer unit may directly respond to the vibration of the base structure and generate electrical signals. It should be noted that the base structure is not limited to an independent structure relative to a housing of the sensor assembly, and in some embodiments, the base structure may further be a portion of the housing of the sensor assembly.

In some embodiments, the sensor assembly may generate the deformation and/or a displacement based on external signals, such as mechanical signals (such as pressures, mechanical vibrations), acoustic signals (such as sound waves), electrical signals, optical signals, thermal signals, etc. The deformation and/or the displacement may be further converted into a target signal by a transducer component of the sensor assembly. The target signal may be an electrical signal, a mechanical signal (such as a mechanical vibration), an acoustic signal (such as a sound wave), an electrical signal, an optical signal, a thermal signal, etc. In some embodiments, the sensor assembly may include a microphone (e.g., an air conduction microphone or a microphone with bone conduction as a main sound transmission manner), an accelerometer, a pressure sensor structure, a hydrophone, an energy harvester, a gyro instrument, etc. The air conduction microphone refers to a microphone that can receive air conduction sound waves and convert the air conduction sound waves into electrical signals. The microphone with bone conduction as a main sound transmission manner refers to a microphone that can at least receive a solid vibration and convert the solid vibration into an electrical signal. For the convenience of description, the embodiments of the present disclosure take the sensor assembly being an air conduction microphone as an example, which does not intend to limit the scope of protection of the present disclosure.

Figure 2:
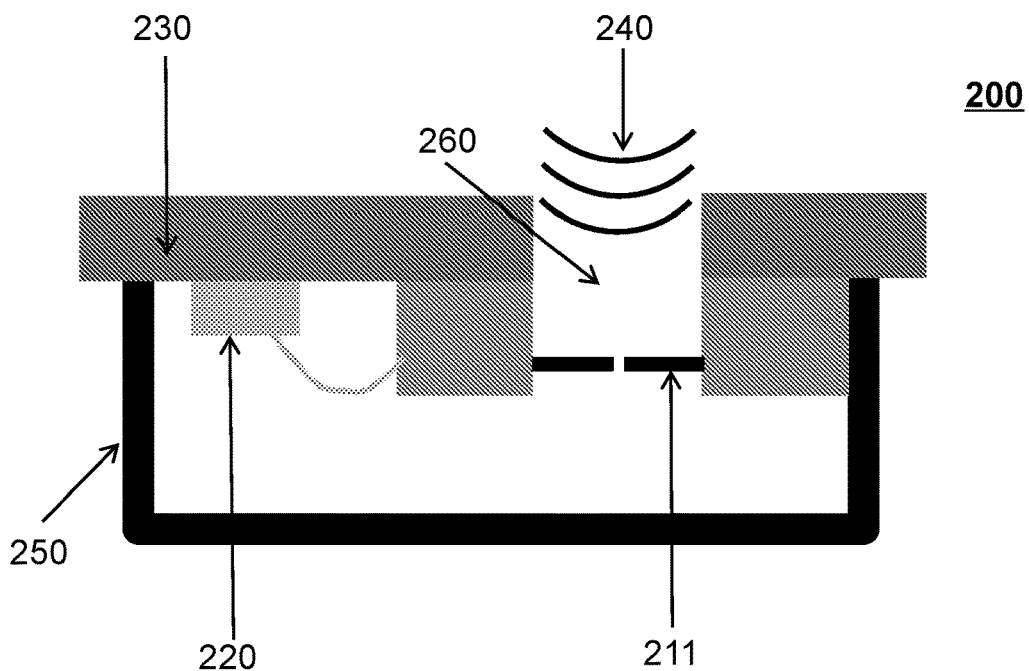
FIG. 2 is a schematic diagram illustrating a structure of a piezoelectric air conduction microphone according to some embodiments of the present disclosure.

FIG. 1 is a schematic diagram illustrating a structure of a condenser air conduction microphone according to some embodiments of the present disclosure. FIG. 2 is a schematic diagram illustrating a structure of a piezoelectric air conduction microphone according to some embodiments of the present disclosure.

In some embodiments, a sensor assembly may include the condenser microphone. Taking a condenser microphone 100 shown in FIG. 1 as an example, the condenser microphone 100 may include a transducer element 110, a processor 120, a printed circuit board (PCB) 130, a housing 150, and a sound inlet 160. In some embodiments, the transducer element 110 may convert an external vibration signal (e.g., an air conduction sound 140) into an electrical signal. As shown in FIG. 1, the transducer element 110 may include a diaphragm 111 and a back plate 112. The diaphragm 111 and the back plate 112 may form a capacitor. For example, the diaphragm 111 and the back plate 112 may be placed in parallel and relatively close to each other to form two poles of the capacitor. When the air conduction sound 140 causes the diaphragm 111 to vibrate through the sound inlet 160, a distance between the diaphragm 111 and the back plate 112 changes, thereby changing a capacitance of the capacitor. When a voltage remains constant, changes of an electricity in the capacitor may generate the electrical signal such that a sound collection may be implemented.

In some embodiments, the processor 120 may obtain the electrical signal from the transducer element 110 and perform a signal processing. In some embodiments, the signal processing may include a frequency modulation processing, an amplitude modulation processing, a filtering processing, a noise reduction processing, etc. The processor 120 may include a microcontroller, a microprocessor, an application specific integrated circuit (ASIC), an application specific instruction-set processor (ASIP), a central processing unit (CPU), a physical processing unit (PPU), a digital signal processor (DSP), a field-programmable gate array (FPGA), an advanced RISC machine (ARM), a programmable logic device (PLD), or other types of processing circuits or processors.

In some embodiments, a circuit and other components of the condenser microphone 100 (such as the transducer element 110 and the processor 120) may be disposed on the PCB 130 (e.g., by a laser etching, a chemical etching, etc.). In some embodiments, the transducer element 110 and/or the processor 120 may be fixedly connected to the PCB 130 through a conductive adhesive (e.g., a conductive silver adhesive, a copper powder conductive adhesive, a nickel carbon conductive adhesive, a silver copper conductive adhesive, etc.). The conductive adhesive may include a conductive glue, a conductive adhesive film, a conductive rubber ring, a conductive tape, etc. In some embodiments, the transducer element 110 and/or the processor 120 may be electrically connected to other components through the circuit on the PCB 130. In some embodiments, the transducer element 110 and the processor 120 may be directly connected through wires (such as gold wires, copper wires, aluminum wires, etc.).

In some embodiments, the PCB 130 may be a phenolic PCB paper substrate, a composite PCB substrate, a glass fiber PCB substrate, a metal PCB substrate, a build-up multilayer PCB substrate, etc. For example, the PCB 130 may include an FR-4 grade glass fiber PCB substrate made of epoxy glass fiber cloth. In some embodiments, the PCB 130 may include a flexible printed circuit board (FPC).

In some embodiments, the housing 150 may be a regular or irregular 3D structure with a cavity (i.e., a hollow portion) inside, such as a hollow frame structure, including but not limited to a rectangular frame, a circular frame, a regular polygonal box, and any irregular shapes. In some embodiments, the transducer element 110, the processor 120, the PCB 130, and the circuits and other components disposed thereon may be sealed. In some embodiments, the housing 150 may include the sound inlet, through which the transducer element 110 may communicate with an external sound.

In some embodiments, the housing 150 may be made of metal (e.g., a stainless steel, a copper, etc.), plastic (e.g., polyethylene (PE), polypropylene (PP), polyvinyl chloride (PVC), polystyrene (PS), acrylonitrile butadiene styrene copolymer (ABS), composite materials (such as metal matrix composites or non-metal matrix composites), etc. Merely by way of example, the material of the housing 150 may be brass.

In some embodiments, the sensor assembly may include a piezoelectric microphone, and the piezoelectric microphone may include the above-mentioned base structure and the above-mentioned laminated structure (such as the cantilever beam, the supporting arm, or the mass element). Taking a piezoelectric microphone 200 shown in FIG. 2 as an example, the piezoelectric microphone 200 may include a transducer element, a processor 220, a PCB 230, a housing 250, and a sound inlet 260. The transducer element may include a diaphragm 211 and a piezoelectric element (not shown in FIG. 2). The diaphragm 211 may be connected to or in contact with the piezoelectric element (not shown in FIG. 2). In some embodiments, the piezoelectric element (not shown in FIG. 2) may be attached to the diaphragm 211, and when the air conduction sound 240 causes the housing 250 or the diaphragm 211 to vibrate through the sound inlet 260, the piezoelectric element (not shown in FIG. 2) is driven to deform, and then an electric signal is generated through a piezoelectric effect of the piezoelectric element (not shown in FIG. 2) during the deformation such that the sound collection may be implemented. In some embodiments, a difference between the piezoelectric microphone 200 and the condenser microphone 100 lies in the transducer element, and other elements such as the processor, the PCB, the housing, the sound inlet, etc. are the same or similar. For more descriptions about the processor 220, the PCB 230, the housing 250, and the sound inlet 260, please refer to the descriptions about the processor 120, the PCB 130, the housing 150, and the sound inlet 160.

It should be noted that, the above description of the transducer elements in the piezoelectric microphone (such as the piezoelectric microphone 200) is only an example, and is not intended to limit the scope of the present disclosure. In some embodiments, the transducer element in the piezoelectric microphone may only include the diaphragm, and the diaphragm includes a piezoelectric film. The air conduction sound causes the vibration and deformation of the diaphragm through the sound inlet, and then the electrical signal may be generated according to the piezoelectric effect when the diaphragm deforms, thereby realizing the sound collection.

In some embodiments, to improve a response of the sensor assembly to the air conduction sound, the sensor assembly may be combined with one or more additional sound pickup assemblies to form the sensor device. A structure of the sensor device may be the same as or similar to the structure of the foregoing sensor assembly (e.g., the condenser microphone 100, and the piezoelectric microphone 200).

In some embodiments, the sound pickup assembly may be disposed between the transducer element of the sensor assembly and the sound inlet. The sound pickup assembly may be configured to communicate with the external sound of the sensor device (such as the air conduction sound) through the sound inlet and form an acoustic cavity with the sensor assembly. When the sound pickup assembly vibrates in response to the air conduction sound transmitted through the sound inlet, the vibration may cause a change of a sound pressure in the acoustic cavity. The sensor assembly converts the air conduction sound to the electrical signal based on the change of the sound pressure in the acoustic cavity, so as to implement the collection of sound.

In some embodiments, the sensor assembly may provide the sensor device with a first resonant frequency, and the sound pickup assembly may provide the sensor device with a second resonant frequency. In some embodiments, a difference between the first resonant frequency and the second resonant frequency may be in a range of 1000 Hz-10000 Hz. In some embodiments, the difference between the first resonant frequency and the second resonant frequency may be in a range of 2000 Hz-8000 Hz. In some embodiments, the difference between the first resonant frequency and the second resonant frequency may be in a range of 3000 Hz and 7000 Hz. In some embodiments, the difference between the first resonant frequency and the second resonant frequency may be in a range of 4000 Hz-6000 Hz. In some embodiments, the first resonant frequency is related to properties (e.g., a shape, a material, a structure) of the sensor assembly itself. In some embodiments, the first resonant frequency may be above 10000 Hz. In some embodiments, the first resonant frequency may be above 12000 Hz. In some embodiments, the first resonant frequency may be above 15000 Hz.

In some embodiments, the second resonant frequency is less than the first resonant frequency. In some embodiments, the second resonant frequency may be in a range of 2000 Hz-10000 Hz. In some embodiments, the second resonant frequency may be in a range of 2000 Hz-8000 Hz. In some embodiments, the second resonant frequency may be in a range of 3000 Hz-4000 Hz. In some embodiments, the second resonant frequency may be in a range of 3200 Hz-3800 Hz. In some embodiments, the second resonant frequency may be in a range of 3400 Hz-3600 Hz. In some embodiments, the second resonant frequency may be in a range of 2000 Hz-4000 Hz. In some embodiments, the second resonant frequency may be in a range of 4000 Hz-10000 Hz. Compared with the sensor assembly without the sound pickup assembly, a sensitivity of the sensor device with the sound pickup assembly is improved in a wider frequency range.

In some embodiments, the sound pickup assembly is formed by a solid structure (such as a supporting component, a mass block, a diaphragm), a liquid, a gel, etc. or a combination thereof connected to or in contact with the sensor assembly. The liquid, the gel, or the mass block may form a resonant system with the gas in the acoustic cavity formed between the sound pickup assembly and the sensor assembly. The resonant system has a second resonant frequency. In another case, the liquid, the gel, or the mass block may form a resonant system (e.g., a spring-mass system) with the diaphragm. The resonant system has a second resonant frequency. The supporting component may be configured to limit a movement of the liquid, the gel, the diaphragm, or the mass block. In some embodiments, a magnitude of the second resonant frequency and a magnitude relationship between the second resonant frequency and the first resonant frequency may be related to parameters of the sound pickup assembly and/or parameters of the sensor assembly. In some embodiments, to obtain a desired output frequency response of the sensor device or an output frequency response satisfying requirements of practical applications, the parameters of the sound pickup assembly and/or ranges of parameters of the sensor assembly may be determined based on computer simulation, phantom experiments, etc. In some embodiments, based on a simulation, an influence of each factor on the frequency response of the sensor device may be determined one by one by controlling variables.

In some embodiments, the influence of different factors on the frequency response of the sensor device is correlated. In such cases, the influence of a parameter pair or a parameter group on the frequency response of the sensor device may be determined in a form of a corresponding parameter pair or parameter group. For illustration only, taking the sound pickup assembly formed by a combination of the mass block, the diaphragm, and the supporting component as an example, the relationship between the second resonant frequency and the sensitivity of the sensor device and the parameters of the sound pickup assembly and/or the parameters of the sensor assembly is shown in the following Equation (1):

$$(S,f)=g(K_1,K_2,V,R,h,\rho), \tag{1}$$

where S indicates the sensitivity of the sensor device, f indicates the second resonant frequency, $K_1$ indicates a modulus of the diaphragm (such as Young's modulus), $K_2$ indicates a modulus of the supporting component (such as Young's modulus), V indicates a volume of the acoustic cavity, R indicates a radius of the mass block, h indicates a height of the mass block, and $\rho$ indicates a density of the mass block.

In some embodiments, the second resonant frequency may increase as the modulus of the diaphragm increases. In some embodiments, the second resonant frequency may increase as the modulus of the supporting component increases. In some embodiments, the second resonant frequency may decrease and then increase as a size (e.g., the radius, an area) of the mass block perpendicular to a vibration direction of the diaphragm increases. In some embodiments, the second resonant frequency may decrease as the height of the mass block along the vibration direction of the diaphragm increases. In some embodiments, the second resonant frequency may decrease as the density of the mass block increases.

In some embodiments, the sensitivity of the sensor device may decrease as the modulus of the diaphragm increases. In some embodiments, the sensitivity of the sensor device may decrease as the modulus of the supporting component increases. In some embodiments, the sensitivity of the sensor device may increase and then decrease as the volume of the cavity increases. In some embodiments, the sensitivity of the sensor device may increase and then decrease as the radius of the mass block (e.g., along the direction perpendicular to the vibration direction of the diaphragm) increases. The sensitivity of the sensor device may increase with the increase of the height of the mass block (e.g., along the vibration direction of the diaphragm). In some embodiments, the sensitivity of the sensor device may increase as the density of the mass block increases.

In some embodiments, the sound pickup assembly may include a liquid, a gel, or a composition thereof. The liquid, the gel, or the composition thereof may form the resonant system (such as a spring-mass system) with the gas in the above-mentioned acoustic cavity, and the resonant system has a second resonant system. For example, the liquid, the gel, or the composition thereof may be considered as a mass in the resonant system, and the gas in the acoustic cavity may be considered as a spring in the resonant system. In some embodiments, the sound pickup assembly formed by the liquid, the gel, or the composition thereof may be substantially parallel to the diaphragm (also referred to as a second diaphragm) in the sensor assembly. The "substantially parallel" used here means that a surface (such as an upper surface, a lower surface) of the sound pickup assembly is parallel to a surface (such as an upper surface, a lower surface) of the second diaphragm or a deviation between the surface of the sound pickup assembly and the surface of the second diaphragm is less than 3 degrees, 5 degrees, 8 degrees, 10 degrees, etc.

In some embodiments, the PCB in the sensor assembly may be configured to limit the movement of the liquid, the gel, or the composition thereof. For example, the liquid, the gel, or the composition thereof may be limited within a limited space in the PCB so that the liquid, the gel, or the composition thereof may only move within the limited space. If a viscosity of the liquid, the gel, or the composition thereof reaches a certain threshold, the liquid, the gel, or the composition thereof may adhere to an inner wall of the limited space.

To make the second resonant frequency provided by the sound pickup assembly within a target frequency range, in some embodiments, the density of the liquid may be between 0 $g/cm^3$-3 $g/cm^3$. In some embodiments, the liquid may have a density between 0 $g/cm^3$-2 $g/cm^3$. In some embodiments, the liquid may have a density between 0 $g/cm^3$-1 $g/cm^3$. In some embodiments, the liquid may have a density between 1 $g/cm^3$-3 $g/cm^3$. In some embodiments, the viscosity of the gel may be between 1 Cstokes (cst)-3000 (cst). In some embodiments, the viscosity of the gel may be between 1 cst-1000 cst. In some embodiments, the viscosity of the gel may be between 50 cst-900 cst. In some embodiments, the viscosity of the gel may be between 100 cst-700 cst. In some embodiments, the viscosity of the gel may be between 200 cst-500 cst. In some embodiments, the viscosity of the gel may be between 300 cst-400 cst. In some embodiments, the viscosity of the gel may be between 1 cst-500 cst. In some embodiments, the viscosity of the gel may be between 500 cst-3000 cst.

In some embodiments, when a type of the liquid or the gel is selected, a safety (such as non-flammable and non-explosive), a stability (such as non-volatile, high-temperature deterioration, etc.) of the liquid or the gel may be considered. For example, the liquid may include oil (such as silicone oil, glycerin, castor oil, engine oil, lubricating oil, hydraulic oil (such as aviation hydraulic oil), etc.), water (including pure water, aqueous solutions of other inorganic or organic substances, etc. (such as brine)), oil-water emulsion, etc., or any combination thereof. The gel may include natural hydrogels (such as agarose, methylcellulose, hyaluronic acid, gelatin, and chitosan), synthetic hydrogels (such as polyacrylamide, polyvinyl alcohol, sodium polyacrylate, acrylate polymer objects) aerogels, or a composition thereof.

In some embodiments, the magnitude of the second resonant frequency and the magnitude relationship between the second resonant frequency and the first resonant frequency may be adjusted by adjusting properties of the liquid, the gel, or the composition thereof, or the parameters of the sensor assembly. Merely by way of example, the properties of the liquid, the gel, or the composition thereof may include the densities of the liquid, the gel, or the composition thereof, the viscosities of the liquid, the gel, or the composition thereof, the volumes of the liquid, the gel, or the composition thereof, a presence or an absence of bubbles, a volume of the bubbles, positions of the bubbles, a count of the bubbles, etc. The parameters of the sensor assembly may include an internal structure, a size, a modulus (such as Young's modulus) of the housing, the mass of the sensor assembly, and/or the size, the modulus (such as Young's modulus) of the transducer element of the sensor assembly, etc. In some embodiments, the greater the density of the liquid, the gel, or the composition thereof, the greater the mass of the liquid, the gel, or the composition thereof in a same volume, and the smaller the second resonant frequency. In some embodiments, the greater the viscosity of the liquid, the gel, or the composition thereof, the less likely the liquid, the gel, or the composition thereof may vibrate in a specific direction (e.g., a longitudinal direction), and the greater the second resonant frequency.

In some embodiments, the density or the viscosity of the liquid, the gel, or the combination thereof may be determined according to the required second resonant frequency. For example, if the second resonant frequency needs to be in a greater frequency region (such as 4000 Hz-10000 Hz), a liquid, a gel, or the composition with a higher viscosity (such as 500 cst-3000 cst) or a liquid, a gel, or the composition thereof with a lower density (e.g., 0 $g/cm^3$-1 $g/cm^3$) may be selected. If the second resonant frequency needs to be in a small frequency region (such as 2000 Hz-4000 Hz), a liquid, a gel, or a composition thereof with a low viscosity (such as 1 cst-500 cst) or a liquid, a gel, or a composition thereof with a high density (such as 1 $g/cm^3$-3 $g/cm^3$) may be selected.

In some embodiments, the sound pickup assembly may include the liquid (or the gel or the composition thereof) and the supporting component. The liquid (or the gel or the composition thereof) may form, together with the gas in the above-mentioned acoustic cavity, a resonant system (such as the spring-mass system) having the above-mentioned second resonant frequency. The supporting component is configured to limit the movement of the liquid (or the gel or the composition thereof), thereby ensuring a stability of the frequency response of the sensor device. In some embodiments, a cross-section of the supporting component may be rectangular, circular, annular, square, pentagonal, hexagonal, etc. In some embodiments, the supporting component may include a pipe column (e.g., a straight pipe column, a curved pipe column) connected to or in contact with the sensor assembly. For example, the pipe column may be connected to or in contact with one side of the PCB in the sensor assembly. To make the second resonant frequency provided by the sound pickup assembly within the target frequency range, in some embodiments, a height of the pipe column may be 0.1 mm-50 mm. In some embodiments, the height of the pipe column may be 1 mm-40 mm. In some embodiments, the height of the pipe column may be 5 mm-30 mm. In some embodiments, the height of the pipe column may be 10 mm-20 mm. In some embodiments, a diameter of the pipe column (along a direction perpendicular to the vibration direction of the diaphragm) may be greater than or equal to a diameter of the acoustic cavity (along the direction perpendicular to the vibration direction of the diaphragm). In some embodiments, the diameter of the pipe column is 0.01 mm-5 mm. In some embodiments, the diameter of the pipe column is 0.1 mm-6 mm. In some embodiments, the diameter of the pipe column is 1 mm-10 mm. In some embodiments, the diameter of the pipe column is 5 mm-20 mm.

It should be noted that a principle of generating the second resonant frequency by the sound pickup assembly including the liquid (or the gel or the composition thereof) and the supporting component is the same or similar to the above-mentioned sound pickup assembly including the liquid, the gel, or the composition thereof. For more related descriptions, please refer to the above-mentioned descriptions of the sound pickup assembly including the liquid, the gel, or the composition thereof, which are not repeated here.

In some embodiments, in addition to adjusting the magnitude of the second resonant frequency by adjusting the properties of the liquid, the gel, or the composition thereof or the parameters of the sensor assembly, the properties of the supporting component (such as the modulus of the supporting component) may be adjusted to adjust the magnitude of the second resonant frequency. In some embodiments, the greater the modulus of the supporting component, the greater the second resonant frequency.

It should be noted that the resonant system with the second resonant frequency is formed by the vibration of the diaphragm in a vertical direction, and the vibrations of the diaphragm in other directions may have an adverse effect on the resonant system with the second resonant frequency (such as resulting in an unstable frequency response curve). In some embodiments, the supporting component may be disposed on a left and/or a right side the liquid (or the gel, or the component thereof) to suppress the vibrations of the diaphragm in other directions. In addition, if the supporting component is prone to vibrating under an action of an external sound, a vibration of the supporting component may cause the diaphragm to vibrate in other directions. To avoid this problem, the modulus of the supporting component may be greater than a certain threshold. Merely by way of example, a material of the supporting component may include an ultraviolet curable glue (also referred to as a photosensitive glue, a shadowless glue), a polydimethylsiloxane (PDMS), a foam, etc., or any combination thereof.

In some embodiments, the sound pickup assembly may include the diaphragm. The diaphragm may form a resonant system having the aforementioned second resonant frequency. In some embodiments, the diaphragm may be connected to the PCB in the sensor assembly. For example, the diaphragm may be fixedly connected to the PCB through adhesives, clips, bolts, etc. so that the movement of the diaphragm along a specific direction (not longitudinal, such as horizontal) may be limited. In some embodiments, a count of diaphragms is not limited, such as 2, 3, 4, etc.

To make the second resonant frequency provided by the sound pickup assembly within the target frequency range, in some embodiments, the modulus of the diaphragm (such as Young's modulus) may be 100 MPa-300 GPa. In some embodiments, the modulus of the diaphragm may be 1 GPa-200 GPa. In some embodiments, the modulus of the diaphragm may be 5 GPa-50 GPa. In some embodiments, the modulus of the diaphragm may be 1 GPa-10 GPa. In some embodiments, the modulus of the diaphragm may be 2 GPa-8 GPa. In some embodiments, the modulus of the diaphragm may be 3 GPa-7 GPa. In some embodiments, the modulus of the diaphragm may be 4 GPa-6 GPa. In some embodiments, the modulus of the diaphragm may be 1 GPa. In some embodiments, the modulus of the diaphragm may be 1/100-1/10 of the modulus of the second diaphragm. In some embodiments, the modulus of the diaphragm may be 1/50-1/5 of the modulus of the second diaphragm. In some embodiments, the modulus of the diaphragm may be 1/25-2/5 of the modulus of the second diaphragm. In some embodiments, the modulus of the diaphragm may be 1/20-1/2 of the modulus of the second diaphragm. Merely by way of example, the diaphragm may include a polytetrafluoroethylene film, a polydimethylsiloxane film, a plastic film such as polyethylene, polypropylene, polystyrene, polyvinyl chloride, polyester, cellophane, paper, metal foil, etc., or any combination thereof.

In some embodiments, a shape of the cross-section of the diaphragm (e.g., along the direction perpendicular to the vibration direction of the diaphragm) may be circular, triangular, quadrilateral, polygonal, etc. In some embodiments, the shape of the cross-section of the diaphragm may be adapted to the shape of a radial cross-section (e.g., along the direction perpendicular to the vibration direction of the diaphragm) of the acoustic cavity defined by the sound pickup assembly and the sensor assembly. In some embodiments, the acoustic cavity may be cylindrical, and correspondingly, the cross-section of the diaphragm may be circular. In some embodiments, the radius of the diaphragm may depend on the size of the acoustic cavity. For example, the radius of the diaphragm may be the same as or close to the radius of the acoustic cavity. To make the second resonant frequency provided by the sound pickup assembly within the target frequency range, in some embodiments, the radius of the diaphragm may be 500 um-3 mm. In some embodiments, the radius of the diaphragm may be 800 um-2.5 mm. In some embodiments, the radius of the diaphragm may be 1 mm-2 mm. In some embodiments, the radius of the diaphragm may be 1.2 mm-1.6 mm. In some embodiments, a thickness of the diaphragm may be 500 nm-100 um. In some embodiments, the thickness of the diaphragm may be 800 nm-80 um. In some embodiments, the thickness of the diaphragm may be 1000 nm-50 um. In some embodiments, the thickness of the diaphragm may be 2000 nm-30 um. In some embodiments, the thickness of the diaphragm may be 5000 nm-10 um.

In some embodiments, the magnitude of the second resonant frequency may be adjusted by adjusting the properties of the diaphragm or the parameters of the sensor assembly. For example, the properties of the diaphragm may include the modulus of the diaphragm, the size (e.g., a length, a width, a thickness) of the diaphragm, etc. The parameters of the sensor assembly may include the internal structure, size, modulus of the housing of the sensor assembly, the mass of the sensor assembly, and/or the size, the modulus, etc. of the transducer elements of the sensor assembly. In some embodiments, the greater the modulus of the diaphragm, the greater the second resonant frequency. The modulus of the diaphragm may be determined according to the magnitude of the required second resonant frequency. For example, if the second resonant frequency needs to be in a greater frequency region (such as 4000 Hz-10000 Hz), the diaphragm with a greater modulus (such as 5 Gpa-300 Gpa, 5 Gpa-50 Gpa) may be selected. If the second resonant frequency needs to be in a smaller frequency region (such as 2000 Hz-4000 Hz), the diaphragm with a smaller modulus (such as 100 MPa-5 GPa) may be selected.

In some embodiments, the sound pickup assembly may include the diaphragm and the liquid (or the gel, or the composition thereof). The liquid (or the gel, or the composition thereof) and the diaphragm form the resonant system (such as a spring-mass system) with the above-mentioned second resonant frequency. For example, the liquid (or the gel, or the composition thereof) may be considered as the mass in the resonant system, and the diaphragm may be considered as the spring in the resonant system.

In some embodiments, the diaphragm and the PCB in the sensor assembly may be configured to limit the movement of the liquid (or the gel, or the composition thereof). For example, the diaphragm may be placed on a first side end (an upper side, a lower side) of the liquid (or the gel, or the composition thereof), and a second side end of the liquid (or the gel, or the composition thereof) is connected to (left, right of) the PCB in the sensor assembly to limit the movement of the liquid (or the gel, or a composition thereof). It should be noted that, to ensure that the liquid or the gel does not leak from the diaphragm, a permeability of the diaphragm needs to be less than a threshold. In some embodiments, a count of diaphragms is not limited, such as 2, 3, 4, etc.

In some embodiments, the magnitude of the second resonant frequency may be adjusted by adjusting the properties of the liquid (or the gel, or the composition thereof), the properties of the diaphragm, or the parameters of the sensor assembly. For more related descriptions, please refer to the above description of the sound pickup assembly including the liquid (or the gel, or the composition thereof) or the descriptions of the sound pickup assembly including the diaphragm, which will not be repeated here.

In some embodiments, the sound pickup assembly may include the diaphragm, the liquid (or the gel, or the composition thereof), and the supporting component. The liquid (or the gel, or the composition thereof) and the diaphragm form the resonant system (such as the spring-mass system) with the above-mentioned second resonant frequency. For example, the liquid, the gel, or the composition thereof may be considered as the mass in the resonant system, and the diaphragm may be considered as the spring in the resonant system.

In some embodiments, the diaphragm and the supporting component may be configured to limit the movement of the liquid (or the gel, or the composition thereof). For example, the diaphragm may be placed on a first side end (the upper side, the lower side) of the liquid (or the gel, or the composition thereof), and the supporting component may be placed on a second side end (a left side, a right side) of the liquid (or the gel, or the composition thereof) to limit the movement of the liquid (or the gel, or the composition thereof). In some embodiments, the diaphragm may be connected to the supporting component. The diaphragm may be fixed to an inner wall of the supporting component by a peripheral side of the diaphragm. Merely by way of example, a connection between the diaphragm and the supporting component may include an adhesive bonding, a clipping, a snaping, a bolting, etc. In some embodiments, the count of diaphragms or supporting components is not limited, such as 2, 3, 4, etc.

In some embodiments, the magnitude of the second resonant frequency may be adjusted by adjusting the properties of the liquid (or the gel, or the composition thereof), the properties of the diaphragm, the properties of the supporting components, or the parameters of the sensor assembly. For more relevant descriptions, please refer to the descriptions of the above-mentioned sound pickup assembly including the liquid (or the gel, or the composition thereof), the diaphragm, or the supporting component, which will not be repeated here.

In some embodiments, the sound pickup assembly may include the diaphragm, the liquid (or the gel, or the composition thereof), the supporting component, and the mass block. The liquid (or the gel, or the composition thereof), the diaphragm, and the mass block form the resonant system (such as the spring-mass system) with the above-mentioned second resonant frequency. For example, the liquid and the mass block may be regarded as the mass in the resonant system, and the diaphragm may be regarded as the spring in the resonant system.

In some embodiments, the mass block may be placed in the liquid (or the gel, or the composition thereof). The diaphragm and supporting component are configured to limit the movement of the liquid (or the gel, or the composition thereof). In some embodiments, the diaphragm may be located at the first side end (such as the upper side, the lower side) of the liquid (or the gel, or the composition thereof), and the supporting component may be located at the second side end (the left side, the right side) of the liquid (or the gel, or the composition thereof) to limit the movement of the liquid (or the gel, or the composition thereof). In some embodiments, the count of the diaphragms or the supporting components is not limited, such as 2, 3, 4, etc. For more descriptions about the supporting component, the liquid (or the gels, or the composition thereof), or the diaphragm, please refer to the above-mentioned descriptions of the sound pickup assembly including the supporting component, the liquid (or the gels, or the combinations thereof), or the diaphragm, which are not repeated here.

In some embodiments, the mass block may be in the shape of a square, a cuboid, a cylinder, a ring, etc. To make the second resonant frequency provided by the sound pickup assembly within the target frequency range, in some embodiments, a thickness of the mass block (along the vibration direction of the diaphragm) is 1 um-5000 um. In some embodiments, the thickness of the mass block is 1 um-3000 um. In some embodiments, the thickness of the mass block is 1 um-1000 um. In some embodiments, the thickness of the mass block is 1 um-500 um. In some embodiments, the thickness of the mass block is 1 um-200 um. In some embodiments, the thickness of the mass block is between 1 um-50 um.

To make the second resonant frequency provided by the sound pickup assembly within the target frequency range, in some embodiments, the mass block has an area (such as a cross-sectional area or a bottom area along the direction perpendicular to the vibration direction of the diaphragm) of 0.1 mm$^2$-100 mm$^2$. In some embodiments, the mass block has an area of 0.1 mm$^2$-50 mm$^2$. In some embodiments, the mass block has an area of 0.1 mm$^2$-10 mm$^2$. In some embodiments, the mass block has an area of 0.1 mm$^2$-6 mm$^2$. In some embodiments, the mass block has an area of 0.1 mm$^2$-3 mm$^2$. In some embodiments, the mass block has an area of 0.1 mm$^2$-1 mm$^2$.

To make the second resonant frequency provided by the sound pickup assembly within the target frequency range, in some embodiments, the mass block has a material density of 2 g/cm$^3$-100 g/cm$^3$. In some embodiments, the mass block has a material density of 2 g/cm$^3$-70 g/cm$^3$. In some embodiments, the mass block has a material density of 5 g/cm$^3$-50 g/cm$^3$. In some embodiments, the mass block has a material density of 5 g/cm$^3$-30 g/cm$^3$. In some embodiments, the mass block may be made of metals such as a lead, a copper, a silver, a tin, or an alloy of at least two metals.

In some embodiments, a count of mass blocks in the sound pickup assembly is not limited, for example, the count may be one, two, or more. When the sound pickup assembly includes two or more mass blocks, the two or more mass blocks may be respectively fixed on an upper surface and a lower surface of the diaphragm. In some embodiments, when the mass block is located on the lower surface or the upper surface and lower surface of the diaphragm, the sensitivity of the sensor device may be further improved.

In some embodiments, in addition to adjusting the magnitude of the second resonant frequency by adjusting the properties of the liquid, the gel, or the composition thereof, the properties of the diaphragm, the properties of the supporting component, or the parameters of the sensor assembly, the properties of the mass block (such as the thickness, the density, the radius) may be adjusted to adjust the magnitude of the second resonant frequency. In some embodiments, with the same area, the thicker the mass block, the greater the total mass thereof, and the lower the second resonant frequency. In some embodiments, with the same volume, the higher the density of the mass block, the greater the mass thereof, and the lower the second resonant frequency of the sensor device.

In some embodiments, the sound pickup assembly may include the diaphragm, the supporting component, and the mass block. The diaphragm and the mass block form a resonant system (such as the spring-mass system) with the above-mentioned second resonant frequency. For example, the mass block may be regarded as the mass in the resonant system, and the diaphragm may be regarded as the spring in the resonant system. In some embodiments, the mass block may be located above the diaphragm. The supporting component may be connected to the PCB in the sensor assembly to support the diaphragm and the mass block. For more descriptions about the diaphragm, the supporting component, the mass block, or adjusting the magnitude of the second resonant frequency, please refer to the above-mentioned descriptions of the sound pickup assembly including the diaphragm, the supporting component, and the mass block, which are not repeated here.

By providing the sound pickup assembly in the sensor device, the second resonant frequency lower than the first resonant frequency is provided for the sensor device. When a difference between the second resonant frequency and the first resonant frequency satisfies certain conditions, for example, between 1000 Hz and 10000 Hz, the sensitivity of the sensor device with the sound pickup assembly may be improved in a wider frequency range (such as 0 Hz-15000 Hz, 2000 Hz-13000 Hz, 3000 Hz-12000 Hz) compared with the sensor assembly. Especially the sensitivity of the sensor device near the second frequency (such as 2000 Hz-10000 Hz, 3000 Hz-4000 Hz) may be improved. In some embodiments, the sensitivity of the sensor device may be improved by 3 dB-30 dB in a wider frequency range. In some embodiments, the sensitivity of the sensor device may be improved by 3 dB-45 dB in a wider frequency range. In some embodiments, the sensitivity of the sensor device may be improved by 6 dB-30 dB in a wider frequency range.

It should be noted that the sensor device described above includes one sound pickup assembly, which is only for illustration and is not intended to limit the scope of protection of the present disclosure. In some embodiments, the sensor device may include two or more sound pickup assemblies, each of which is the same as or similar to the sound pickup assembly described above. Taking the sensor device including the sensor assembly and two sound pickup assemblies as an example, the sensor assembly may provide the sensor device with the first resonant frequency, and the two sound pickup assemblies may respectively provide the sensor device with a second resonant frequency and a third resonant frequency. The second resonant frequency and the third resonant frequency may satisfy different relationships according to actual application scenarios of the sensor device. For example, the third resonant frequency is a low frequency, a medium and low frequency, a medium and high frequency (such as in a frequency band less than 7000 Hz, 5000 Hz, 4000 Hz, 3000 Hz, 1000 Hz, or 500 Hz), and the second resonant frequency may be greater than the third resonant frequency and be a higher frequency band (such as above 2000 Hz, above 4000 Hz, above 5000 Hz, above 8000 Hz). As another example, both the second resonant frequency and the third resonant frequency are medium and low frequencies. When the sensor device has the resonant frequency in the low frequency or medium and low frequency range, the sensitivity of the sensor device at the low frequency may be higher than that of the sensor assembly (such as the condenser microphone 100, the piezoelectric microphone 200). When the sensor device further has a resonant frequency in the high frequency or the medium and high frequency, a frequency response curve of the resonant frequency is also flatter in the medium and low frequency, which is more conducive to obtaining effective voice signals in the medium and low frequency band.

It should be noted that the above description of applying the sound pickup assembly to the air conduction microphone is only for illustration, and is not intended to limit the scope of protection of the present disclosure. The above sound pickup assembly may further be applied to other devices, such as the microphone with bone conduction as a main sound transmission manner, an accelerometer, a pressure sensor structure, a hydrophone, an energy harvester, a gyroscope, etc. Merely by way of example, the above-mentioned sound pickup assembly may be applied to the microphone with bone conduction a main sound transmission manner. In combination with the above, the resonant system with the second resonant frequency is formed by the vibration of the diaphragm in a longitudinal direction, and the vibrations of the diaphragm in other directions may have an adverse effect on the resonant system with the second resonant frequency (e.g., causing an unstable frequency response curve). In some embodiments, an intensity of an input signal through bone conduction is relatively high. To avoid the adverse effect of the vibrations of the diaphragm in the sound pickup assembly on the second resonant frequency, the modulus (such as Young's modulus) of the diaphragm in the sound pickup assembly may be greater than a certain threshold, such as 5 GPa, 10 GPa, 20 GPa, etc. In addition, when the above-mentioned sound pickup assembly is applied to the bone conduction microphone, the magnitude of the second resonant frequency may be adjusted by adjusting the parameters of the sound pickup assembly with reference to the application of the sound pickup assembly to the air conduction microphone.

Figure 3:
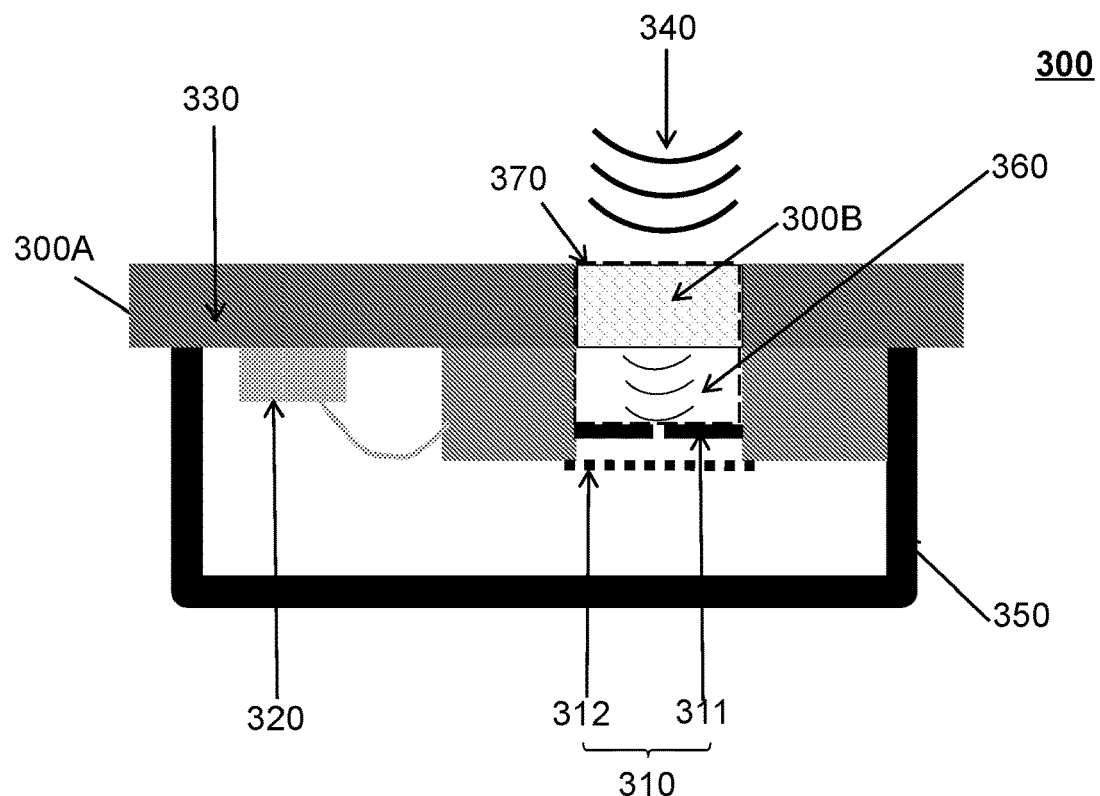
FIG. 3 is a schematic diagram illustrating a structure of an exemplary sensor device according to some embodiments of the present disclosure.
Figure 4:
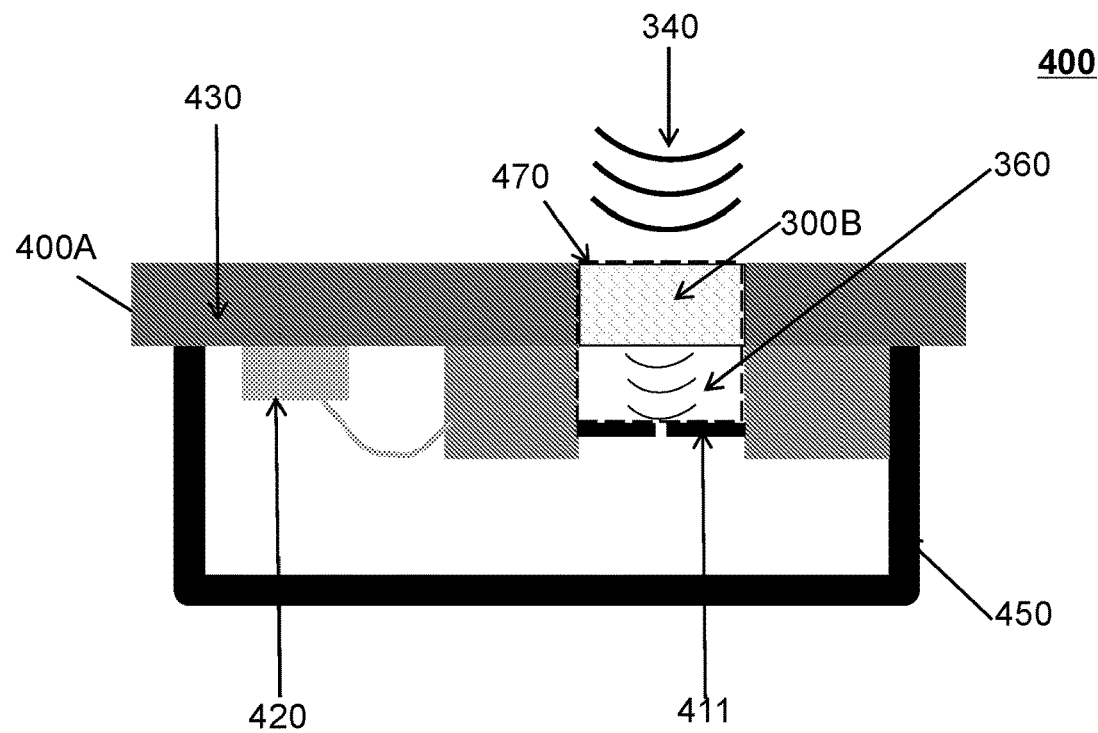
FIG. 4 is a schematic diagram illustrating a structure of an exemplary sensor device according to some embodiments of the present disclosure.

FIG. 3 is a schematic diagram illustrating a structure of an exemplary sensor device according to some embodiments of the present disclosure. FIG. 4 is a schematic diagram illustrating a structure of an exemplary sensor device according to some embodiments of the present disclosure.

As shown in FIG. 3, a sensor device 300 may include a sensor assembly 300A (a condenser microphone) and a sound pickup assembly 300B. The sensor assembly 300A may include a transducer element 310, a processor 320, a PCB 330, and a housing 350. The transducer element 310 may include a diaphragm 311 and a back plate 312. The sensor assembly 300A is the same as or similar to the condenser microphone 100 shown in FIG. 1, which is not repeated here.

In some embodiments, the sensor assembly 300A may include a sound inlet (such as a sound inlet 370 shown in a dashed box, a sound inlet on the housing 350 (not shown in FIG. 3)). The sound pickup assembly 300B may communicate with an external sound of the sensor assembly (an air conduction sound 340 shown in FIG. 3) through the sound inlet. In some embodiments, an acoustic cavity 360 is formed between the sound pickup assembly 300B and the sensor assembly 300A. The external air conduction sound 340 may act on the sound pickup assembly 300B through the sound inlet, and cause the sound pickup assembly 300B to vibrate and deform, thereby causing a sound pressure in the acoustic cavity 360 to change. Further, the transducer element 310 may convert the air conduction sound 340 into an electrical signal based on a change of the sound pressure in the acoustic cavity 360. During this process, the sensor assembly 300A may provide the sensor device 300 with a first resonant frequency. The sound pickup assembly 300B may provide the sensor device 300 with a second resonant frequency. For more descriptions of the first resonant frequency and the second resonant frequency, please refer to the above descriptions of the first resonant frequency and the second resonant frequency, which are not repeated here.

As shown in FIG. 3, the sound pickup assembly 300B may be disposed between the transducer element 310 and the sound inlet 370 of the sensor assembly 300A. For example, the sound pickup assembly 300B may be disposed at the sound inlet 370. The sound pickup assembly 300B may include a liquid, a gel, or a composition thereof. The liquid, the gel, or the composition thereof and the gas in the acoustic cavity 360 may form a resonant system having the above-mentioned second resonant frequency. The sound pickup assembly 300B including the liquid, the gel, or the composition thereof may be substantially parallel to the diaphragm 311. The "substantially parallel" used here means that a surface (such as an upper surface, a lower surface) of the liquid, the gel, or the composition thereof is parallel to a surface (such as an upper surface, a lower surface) of the diaphragm 311 or a deviation between the surface of the liquid, the gel, or the composition thereof and the surface of the diaphragm 311 is less than 3 degrees, 5 degrees, 8 degrees, 10 degrees, etc.

As shown in FIG. 3, the liquid, the gel, or the combination thereof may be connected to the PCB 330. In some embodiments, the liquid, the gel, or the combination thereof may have a certain viscosity such that the liquid, the gel, or the combination thereof may remain fixed relative to the PCB 330. By adjusting the properties (such as the viscosity, a density) of the liquid, the gel, or the combination thereof, a magnitude of the second resonant frequency may be adjusted. For more descriptions regarding adjusting the magnitude of the second resonant frequency, please refer to the above description of the sound pickup assembly including the liquid, the gel, or the composition thereof, which are not repeated here.

In some embodiments, the sound pickup assembly 300B may further form a sensor device 400 with a sensor assembly 400A (a piezoelectric microphone) shown in FIG. 4. The sensor assembly 400A may include a transducer element 411, a processor 420, a PCB 430, a housing 450, and a sound inlet 470. The sensor assembly 400A is the same as or similar to the piezoelectric microphone 200 shown in FIG. 2, which is not repeated here. The sensor device 400 is similar to the sensor device 300 except that types of the sensor assemblies are different. For more related descriptions, please refer to the descriptions of the sensor device 300 in FIG. 3.

Figure 5:
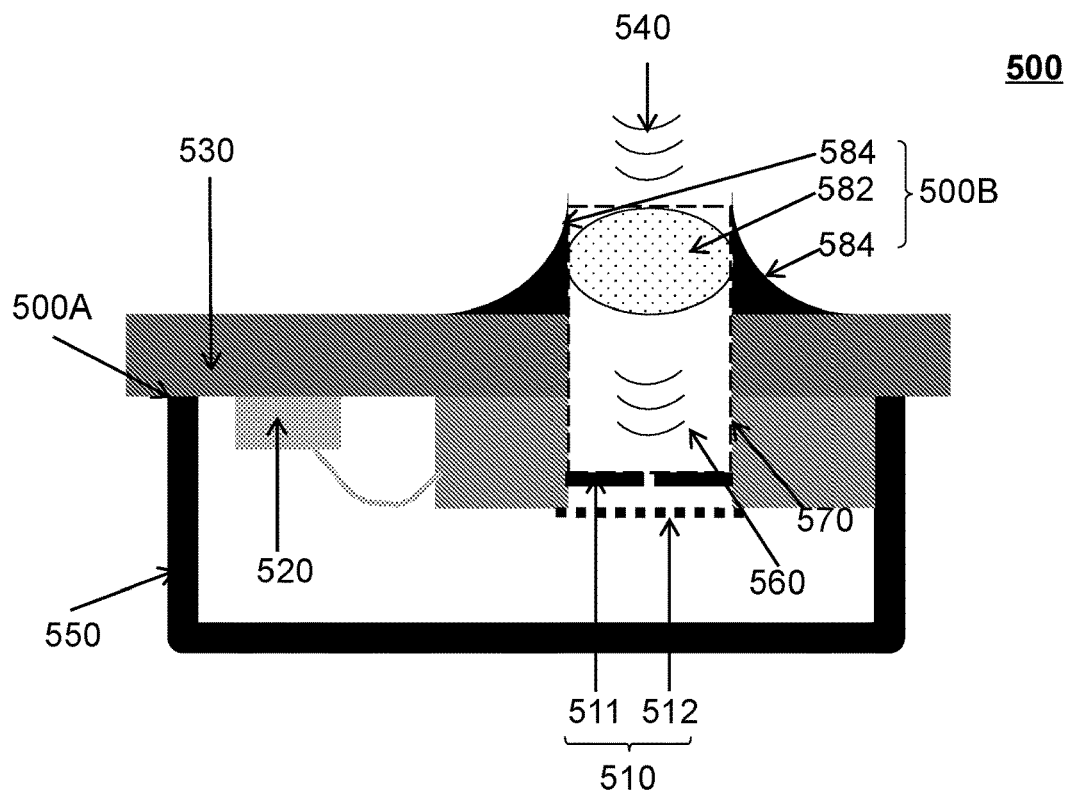
FIG. 5 is a schematic diagram illustrating a structure of an exemplary sensor device according to some embodiments of the present disclosure.
Figure 6:
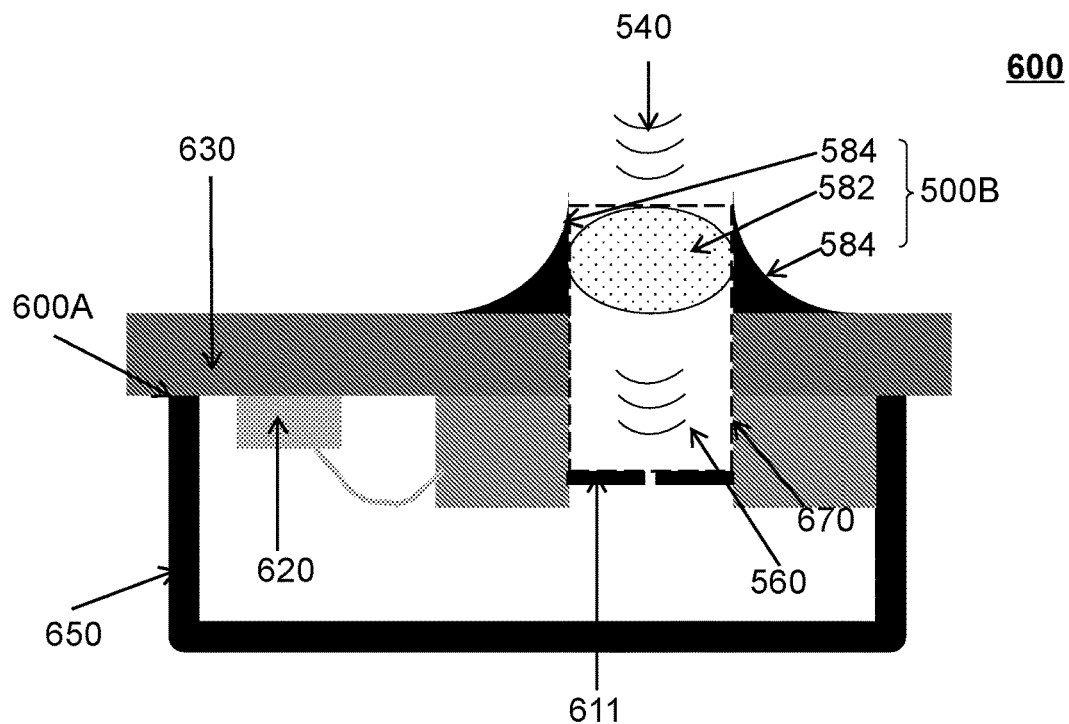
FIG. 6 is a schematic diagram illustrating a structure of an exemplary sensor device according to some embodiments of the present disclosure.

FIG. 5 is a schematic diagram illustrating a structure of an exemplary sensor device according to some embodiments of the present disclosure. FIG. 6 is a schematic diagram illustrating a structure of an exemplary sensor device according to some embodiments of the present disclosure.

As shown in FIG. 5, a sensor device 500 may include a sensor assembly 500A (a condenser microphone) and a sound pickup assembly 500B. The sensor assembly 500A may include a transducer element 510, a processor 520, a PCB 530, and a housing 550. The transducer element 510 may include a diaphragm 511 and a back plate 512. The sensor assembly 500A is the same or similar to the condenser microphone 100 shown in FIG. 1 or the sensor assembly 300A shown in FIG. 3, which is not repeated here.

In some embodiments, the sensor assembly 500A may include a sound inlet (such as a sound inlet 570 shown in the dashed box, a sound inlet on the housing 550 (not shown in FIG. 5)). The sound pickup assembly 500B may communicate with an external sound (the air conduction sound 540 shown in FIG. 5) of the sensor assembly through the sound inlet. In some embodiments, an acoustic cavity 560 is formed between the sound pickup assembly 500B and the sensor assembly 500A. The air conduction sound 540 may act on the sound pickup assembly 500B through the sound inlet, and cause the sound pickup assembly 500B to vibrate and deform, thereby causing the sound pressure in the acoustic cavity 560 to change. Further, the transducer element 510 may convert the air conduction sound 540 into an electrical signal based on a change of the sound pressure in the acoustic cavity 560. During this process, the sensor assembly may provide the sensor device 500 with a first resonant frequency. The sound pickup assembly 500B may provide the sensor device 500 with a second resonant frequency. For more descriptions about the first resonant frequency and the second resonant frequency, please refer to the above descriptions of the first resonant frequency and the second resonant frequency.

As shown in FIG. 5, the sound pickup assembly 500B may be disposed between the transducer element 510 and the sound inlet 570 of the sensor assembly 500A. For example, the sound pickup assembly 500B may be disposed at the sound inlet 570. The sound pickup assembly 500B may include a liquid (or a gel, or a composition thereof) 582 and a supporting component(s) 584. The liquid (or the gel, or the composition thereof) 582 and the gas in the acoustic cavity 560 may form a resonant system having the aforementioned second resonant frequency. The supporting component 584 may be configured to limit a movement of the liquid (or the gel, or the composition thereof) 582. The supporting components 584 may be fixedly connected to the PCB 530 and located on the left and right sides of the liquid (or the gel, or the composition thereof) 582. In some embodiments, the magnitude of the second resonant frequency may be adjusted by adjusting properties (e.g., a viscosity, a density) of the liquid (or the gel, or the composition thereof) 582 and/or properties (e.g., a modulus) of the supporting component 584. For more descriptions regarding adjusting the magnitude of the second resonant frequency, please refer to the above descriptions of the sound pickup assembly including the liquid (or the gel, or the composition thereof) or the supporting component.

In some embodiments, the sound pickup assembly 500B may further form a sensor device 600 with a sensor assembly 600A (a piezoelectric microphone) shown in FIG. 6. The sensor assembly 600A may include a transducer element 611, a processor 620, a PCB 630, a housing 650, and a sound inlet 670. The sensor assembly 600A is the same as or similar to the piezoelectric microphone 200 shown in FIG. 2 or the sensor assembly 400A shown in FIG. 4, which is not repeated here. The sensor device 600 is similar to the sensor device 500 except that the types of sensor assemblies are different. For more related descriptions, please refer to the descriptions of the sensor device 500 in FIG. 5.

Figure 7:
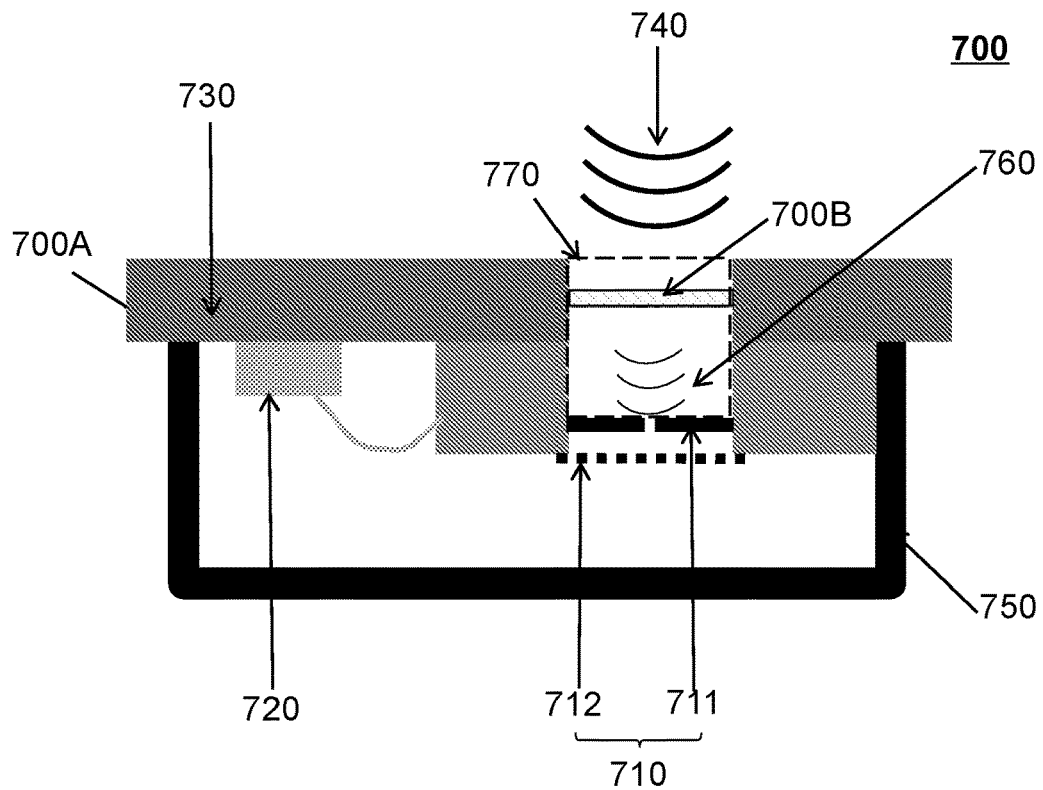
FIG. 7 is a schematic diagram illustrating a structure of an exemplary sensor device according to some embodiments of the present disclosure.
Figure 8:
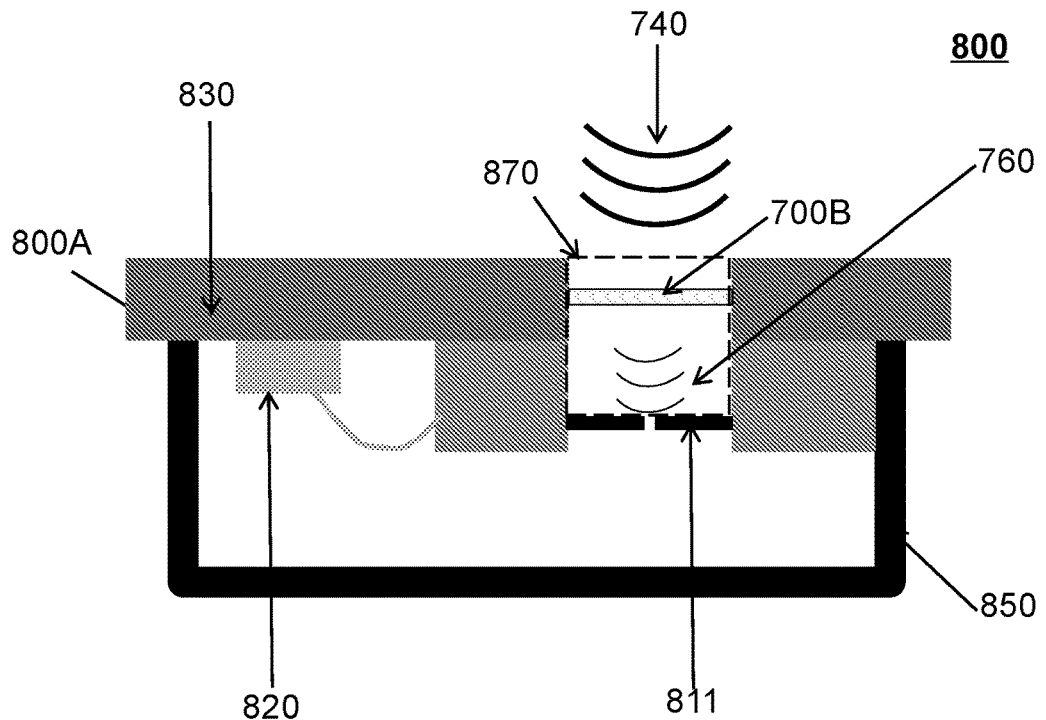
FIG. 8 is a schematic diagram illustrating a structure of an exemplary sensor device according to some embodiments of the present disclosure.

FIG. 7 is a schematic diagram illustrating a structure of an exemplary sensor device according to some embodiments of the present disclosure. FIG. 8 is a schematic diagram illustrating a structure of an exemplary sensor device according to some embodiments of the present disclosure.

As shown in FIG. 7, the sensor device 700 may include a sensor assembly 700A (a condenser microphone) and a sound pickup assembly 700B. The sensor assembly 700A may include a transducer element 710, a processor 720, a PCB 730, and a housing 750. The transducer element 710 may include a diaphragm 711 and a back plate 712. The sensor assembly 700A is the same or similar to the condenser microphone 100 shown in FIG. 1 or the sensor assembly 300A or the sensor assembly 500A shown in FIG. 3 or FIG. 5, which is not repeated here.

In some embodiments, the sensor assembly 700A may include a sound inlet (the sound inlet 770 shown in the dashed box, a sound inlet on the housing 750 (not shown in FIG. 7)). The sound pickup assembly 700B may communicate with an external sound (an air conduction sound 740 as shown in FIG. 7) of the sensor assembly through the sound inlet. In some embodiments, an acoustic cavity 760 is formed between the sound pickup assembly 700B and the sensor assembly 700A. The air conduction sound 740 may act on the sound pickup assembly 700B through the sound inlet, and cause the sound pickup assembly 700B to vibrate and deform, thereby causing the sound pressure in the acoustic cavity 760 to change. Further, the transducer element 710 may convert the air conduction sound 740 into an electrical signal based on a change of the sound pressure in the acoustic cavity 760. During this process, the sensor assembly may provide the sensor device 700 with a first resonant frequency. The sound pickup assembly 700B may provide the sensor device 700 with a second resonant frequency. For more descriptions about the first resonant frequency and the second resonant frequency, please refer to the above descriptions of the first resonant frequency and the second resonant frequency.

As shown in FIG. 7, the sound pickup assembly 700B may be disposed between the transducer element 710 and the sound inlet 770 of the sensor assembly 700A. For example, the sound pickup assembly 700B may be disposed at the sound inlet 770. The sound pickup assembly 700B may include a diaphragm. The diaphragm may form a resonant system having the aforementioned second resonant frequency. The diaphragm may be connected to the PCB 730. In some embodiments, a magnitude of the second resonant frequency may be adjusted by adjusting properties (such as a modulus) of the diaphragm. For more descriptions about the diaphragm or adjusting the magnitude of the second resonant frequency, please refer to the description of the sound pickup assembly including the diaphragm above.

In some embodiments, the sound pickup assembly 700B may further form a sensor device 800 with the sensor assembly 800A (a piezoelectric microphone) shown in FIG. 8. The sensor assembly 800A may include a transducer element 811, a processor 820, a PCB 830, a housing 850, and a sound inlet 870. The sensor assembly 800A is the same or similar to the piezoelectric microphone 200 shown in FIG. 2 or the sensor assembly 400A or the sensor assembly 600A shown in FIG. 4 or FIG. 6, which is not repeated here. The sensor device 800 is similar to the sensor device 700 except that types of the sensor assemblies are different. For more related descriptions, please refer to the description of the sensor device 700 in FIG. 7.

Figure 9:
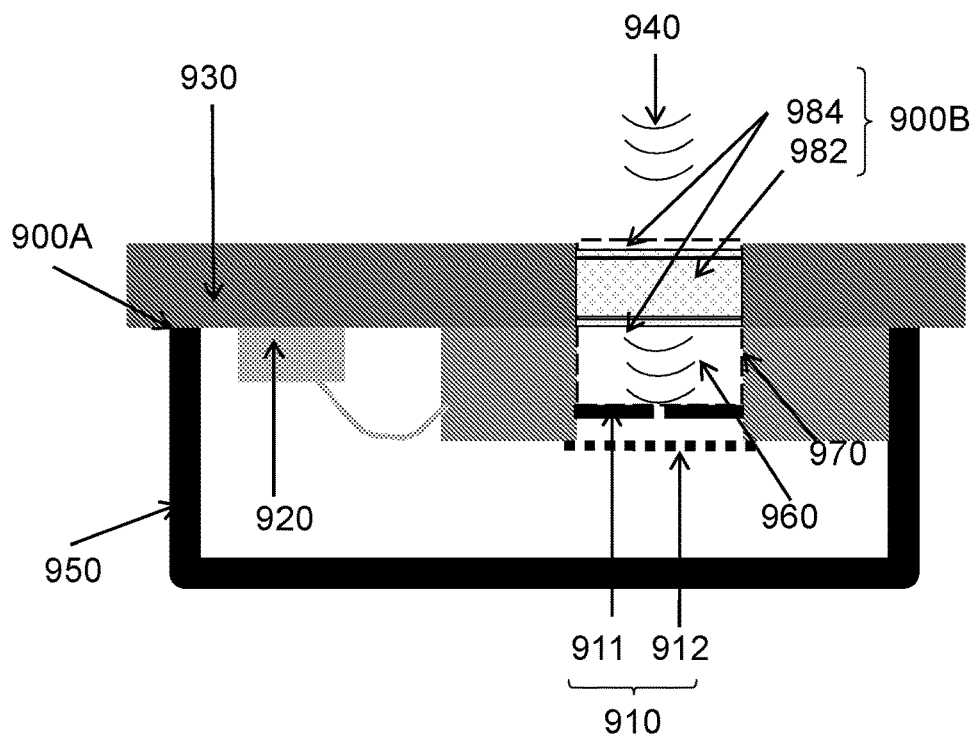
FIG. 9 is a schematic diagram illustrating a structure of an exemplary sensor device according to some embodiments of the present disclosure.
Figure 10:
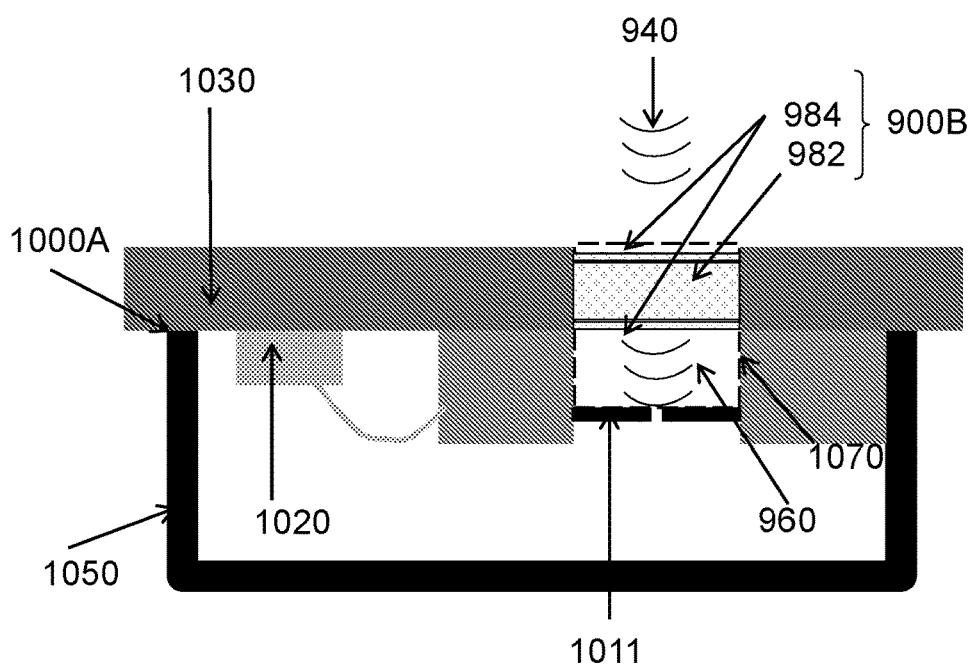
FIG. 10 is a schematic diagram illustrating a structure of an exemplary sensor device according to some embodiments of the present disclosure.

FIG. 9 is a schematic diagram illustrating a structure of an exemplary sensor device according to some embodiments of the present disclosure. FIG. 10 is a schematic diagram illustrating a structure of an exemplary sensor device according to some embodiments of the present disclosure.

As shown in FIG. 9, a sensor device 900 may include a sensor assembly 900A (a condenser microphone) and a sound pickup assembly 900B. The sensor assembly 900A may include a transducer element 910, a processor 920, a PCB 930, and a housing 950. The transducer element 910 may include a diaphragm 911 and a back plate 912. The sensor assembly 900A is the same or similar to the condenser microphone 100 shown in FIG. 1 or the sensor assembly 300A, the sensor assembly 500A, or the sensor assembly 700A shown in FIG. 3, FIG. 5, or FIG. 7, which is not repeated here.

In some embodiments, the sensor assembly 900A may include a sound inlet (such as a sound inlet 970 shown in the dashed box, a sound inlet on the shell 950 (not shown in FIG. 9)). The sound pickup assembly 900B may communicate with an external sound (an air conduction sound 940 as shown in FIG. 9) of the sensor assembly through the sound inlet. In some embodiments, an acoustic cavity 960 is formed between the sound pickup assembly 900B and the sensor assembly 900A. The air conduction sound 940 may act on the sound pickup assembly 900B through the sound inlet, and cause the sound pickup assembly 900B to vibrate and deform, thereby changing the sound pressure in the acoustic cavity 960. Further, the transducer element 910 may convert the air conduction sound 940 into an electrical signal based on a change of the sound pressure in the acoustic cavity 960. During this process, the sensor assembly may provide the sensor device 900 with a first resonant frequency. The sound pickup assembly 900B may provide the sensor device 900 with a second resonant frequency. For more descriptions about the first resonant frequency and the second resonant frequency, please refer to the above descriptions of the first resonant frequency and the second resonant frequency.

As shown in FIG. 9, the sound pickup assembly 900B may be disposed between the transducer element 910 and the sound inlet 970 of the sensor assembly 900A. For example, the sound pickup assembly 900B may be disposed at the sound inlet 970. The sound pickup assembly 900B may include a liquid (or a gel, or a composition thereof) 982 and a diaphragm(s) 984. The liquid (or the gel, or the composition thereof) 982 and the diaphragm 984 may form a resonant system having the above-mentioned second resonant frequency. The diaphragm 984 and the PCB 930 are configured to limit a movement of the liquid (or the gel, or the combination thereof) 982. The PCB 930 may be fixedly connected to the liquid (or the gel, or the composition thereof) 982 and the diaphragm 984, and the PCB 930 is located on left and right sides of the liquid (or the gel, or the composition thereof) 982 and the diaphragm 984. The diaphragms 984 are located on upper and lower sides of the liquid (or the gel, or the composition thereof) 982.

As shown in FIG. 10, the liquid (or the gel, or the composition thereof) 982 and the diaphragm 984 are substantially parallel to the diaphragm 911. The "substantially parallel" used here means that the surface (such as the upper surface and the lower surface) of the liquid (or the gel, or the composition thereof) 982 or the diaphragm 984 is parallel to the surface (such as the upper surface and the lower surface) of the diaphragm 911 or a deviation between the surface of the liquid 982 or the diaphragm 984 and the surface of the diaphragm 911 is less than 3 degrees, 5 degrees, 8 degrees, 10 degrees, etc. In some embodiments, a magnitude of the second resonant frequency may be adjusted by adjusting properties (such as a viscosity, a density) of the liquid (or the gel, or the composition thereof) 982 and/or the properties (such as a modulus) of the diaphragm 984. For more descriptions about adjusting the magnitude of the second resonant frequency, please refer to the above descriptions of the sound pickup assembly including the liquid (or the gel, or the composition thereof) or the diaphragm.

In some embodiments, the sound pickup assembly 900B may further form a sensor device 1000 with a sensor assembly 1000A (a piezoelectric microphone) shown in FIG. 10. The sensor assembly 1000A may include a transducer element 1011, a processor 1020, a PCB 1030, a housing 1050, and a sound inlet 1070. The sensor assembly 1000A is the same as or similar to the piezoelectric microphone 200 shown in FIG. 2, or the sensor assembly 400A, the sensor assembly 600A, or the sensor assembly 800A shown in FIG. 4, FIG. 6, or FIG. 8, which is not repeated here. The sensor device 1000 is similar to the sensor device 900 except that types of the sensor assemblies are different. For more related descriptions, please refer to the descriptions of the sensor device 900 in FIG. 9.

Figure 11:
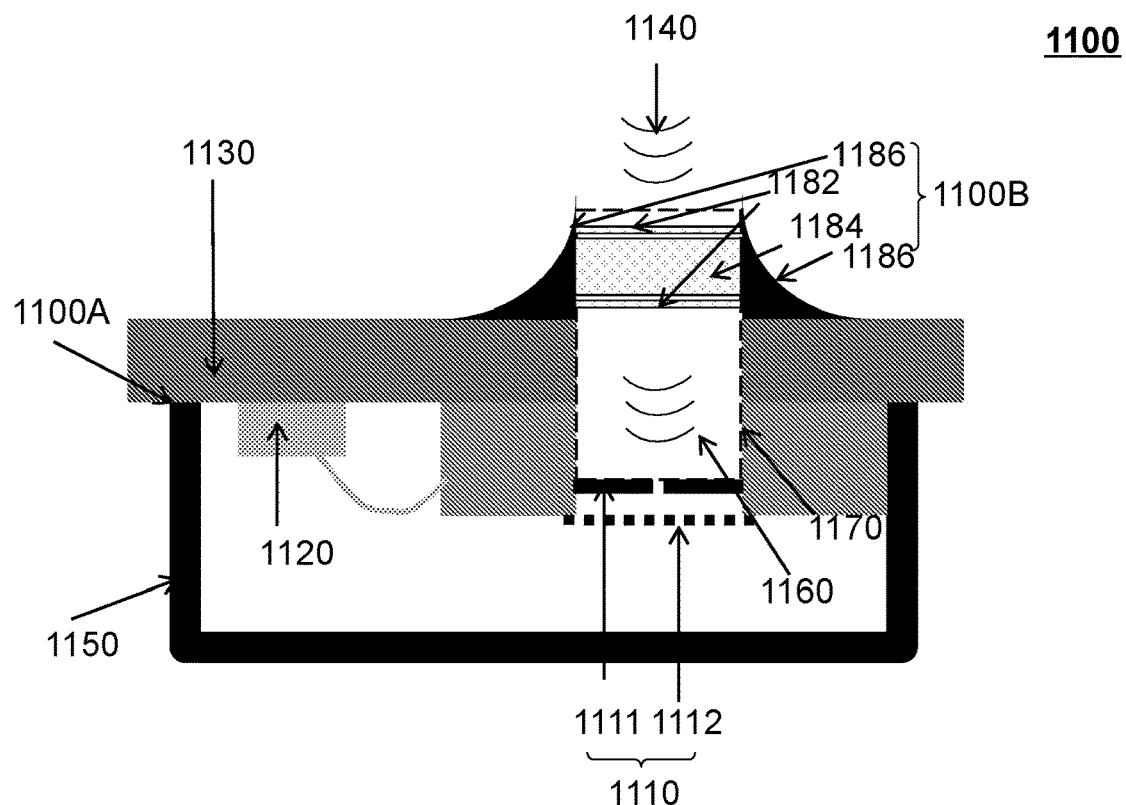
FIG. 11 is a schematic diagram illustrating a structure of an exemplary sensor device according to some embodiments of the present disclosure.
Figure 12:
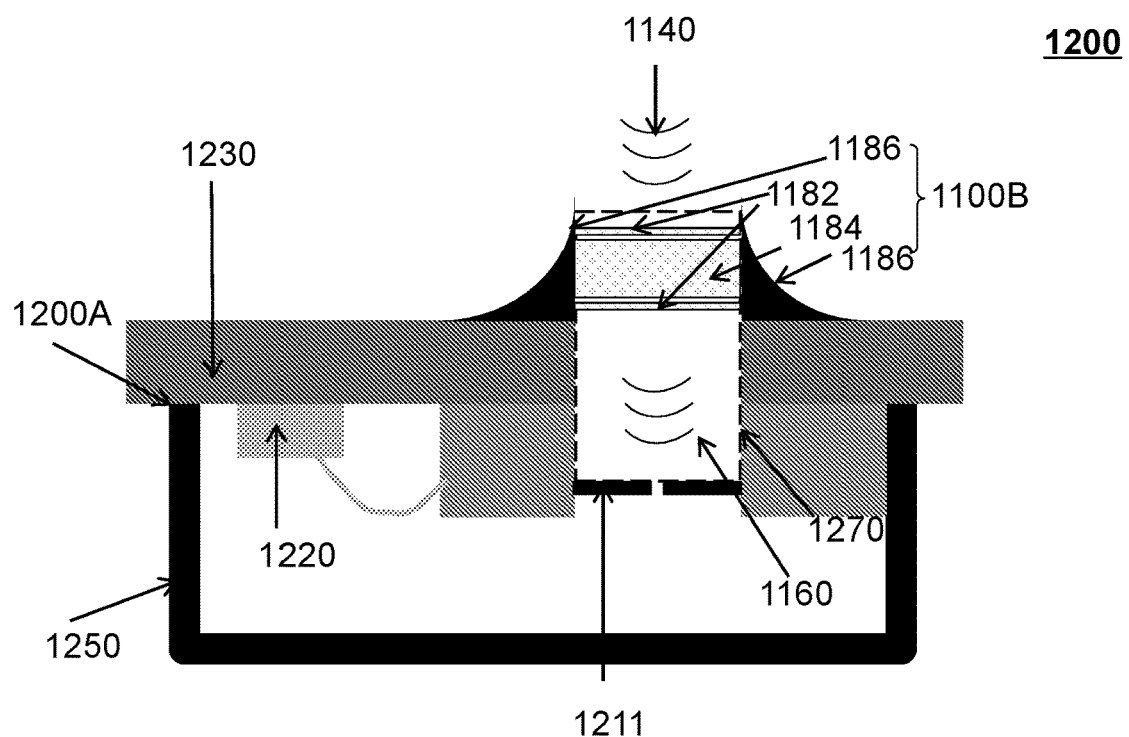
FIG. 12 is a schematic diagram illustrating a structure of an exemplary sensor device according to some embodiments of the present disclosure.

FIG. 11 is a schematic diagram illustrating a structure of an exemplary sensor device according to some embodiments of the present disclosure. FIG. 12 is a schematic diagram illustrating a structure of an exemplary sensor device according to some embodiments of the present disclosure.

As shown in FIG. 11, a sensor device 1100 may include a sensor assembly 1100A (a condenser microphone) and a sound pickup assembly 1100B. The sensor assembly 1100A may include a transducer element 1110, a processor 1120, a PCB 1130, and a housing 1150. The transducer element 1110 may include a diaphragm 1111 and a back plate 1112. The sensor assembly 1100A is the same or similar to the condenser microphone 100 shown in FIG. 1 or the sensor assembly 300A, the sensor assembly 500A, the sensor assembly 700A, or the sensor assembly 900A shown in FIG. 3, 5, 7, or 9, and the details are not repeated here.

In some embodiments, the sensor assembly 1100A may include a sound inlet (the sound inlet 1170 shown in the dashed box, a sound inlet on the housing 1150 (not shown in FIG. 11)). The sound pickup assembly 1100B may communicate with an external sound (an air conduction sound 1140 as shown in FIG. 11) of the sensor assembly through the sound inlet. In some embodiments, an acoustic cavity 1160 is formed between the sound pickup assembly 1100B and the sensor assembly 1100A. The air conduction sound 1140 may act on the sound pickup assembly 1100B through the sound inlet, and cause the sound pickup assembly 1100B to vibrate and deform, thereby causing the sound pressure in the acoustic cavity 1160 to change. Further, the transducer element 1110 may convert the air conduction sound 1140 into an electrical signal based on a change of the sound pressure in the acoustic cavity 1160. During this process, the sensor assembly 1100A may provide the sensor device 1100 with a first resonant frequency. The sound pickup assembly 1100B may provide the sensor device 1100 with a second resonant frequency. For more descriptions of the first resonant frequency and the second resonant frequency, please refer to the above description of the first resonant frequency and the second resonant frequency.

As shown in FIG. 11, the sound pickup assembly 1100B may be disposed between the transducer element 1110 and the sound inlet 1170 of the sensor assembly 1100A. For example, the sound pickup assembly 1100B may be disposed at the sound inlet 1170 and above the PCB 1130. The sound pickup assembly 1100B may include a diaphragm(s) 1182, a liquid (or a gel, or a composition thereof) 1184, and a supporting component(s) 1186. The diaphragms 1182 and the liquid (or the gel, or the composition thereof) 1184 may form a resonant system with the aforementioned second resonant frequency. The diaphragms 1182 may be fixed to inner walls of the supporting components 1186 by peripheral sides of the diaphragms 1182. The diaphragms 1182 and the supporting components 1186 may be configured to limit a movement of the liquid (or the gel, or the composition thereof) 1184. The supporting components 1186 may be fixedly connected to the PCB 1130 and located on left and right sides of the liquid (or the gel, or the composition thereof) 1184. The diaphragms 1182 may be located on an upper side and a lower side of the liquid (or the gel, or the composition thereof) 1184, respectively.

As shown in FIG. 11, the diaphragm(s) 1182 or the liquid (or the gel, or the composition thereof) 1184 is substantially parallel to the diaphragm 1111. The "substantially parallel" used here means that a surface (such as an upper surface, a lower surface) of the diaphragm 1182 or the liquid (or the gel, or the composition thereof) 1184 is parallel to the surface (such as an upper surface, a lower surface) of the diaphragm 1111 or a deviation between the surface of the diaphragm 1182 or the liquid 1184 and the surface of the diaphragm 1111 is less than 3 degrees, 5 degrees, 8 degrees, 10 degrees, etc.

In some embodiments, by adjusting properties (such as a modulus) of the diaphragm 1182, properties (such as a viscosity, a density) of the liquid (or the gel, or the composition thereof) 1184, and/or properties (such as the modulus) of the supporting component 1186, a magnitude of the second resonant frequency may be adjusted. For more descriptions about adjusting the magnitude of the second resonant frequency, please refer to the above description of the sound pickup assembly including the diaphragm, the liquid (or the gel, or the composition thereof), and/or the supporting component.

In some embodiments, the sound pickup assembly 1100B may further form a sensor device 1200 with a sensor assembly 1200A (a piezoelectric microphone) shown in FIG. 12. The sensor assembly 1200A may include a transducer element 1211, a processor 1220, a PCB 1230, a housing 1250, and a sound inlet 1270. The sensor assembly 1200A is the same or similar to the piezoelectric microphone 200 shown in FIG. 2 or the sensor assembly 400A, the sensor assembly 600A, the sensor assembly 800A, or the sensor assembly 1000A shown in FIG. 4, 6, 8, or 10, which is not repeated here. The sensor device 1200 is similar to the sensor device 1100 except that types of the sensor assemblies are different. For more related descriptions, please refer to the descriptions of the sensor device 1100 in FIG. 11.

Figure 13:
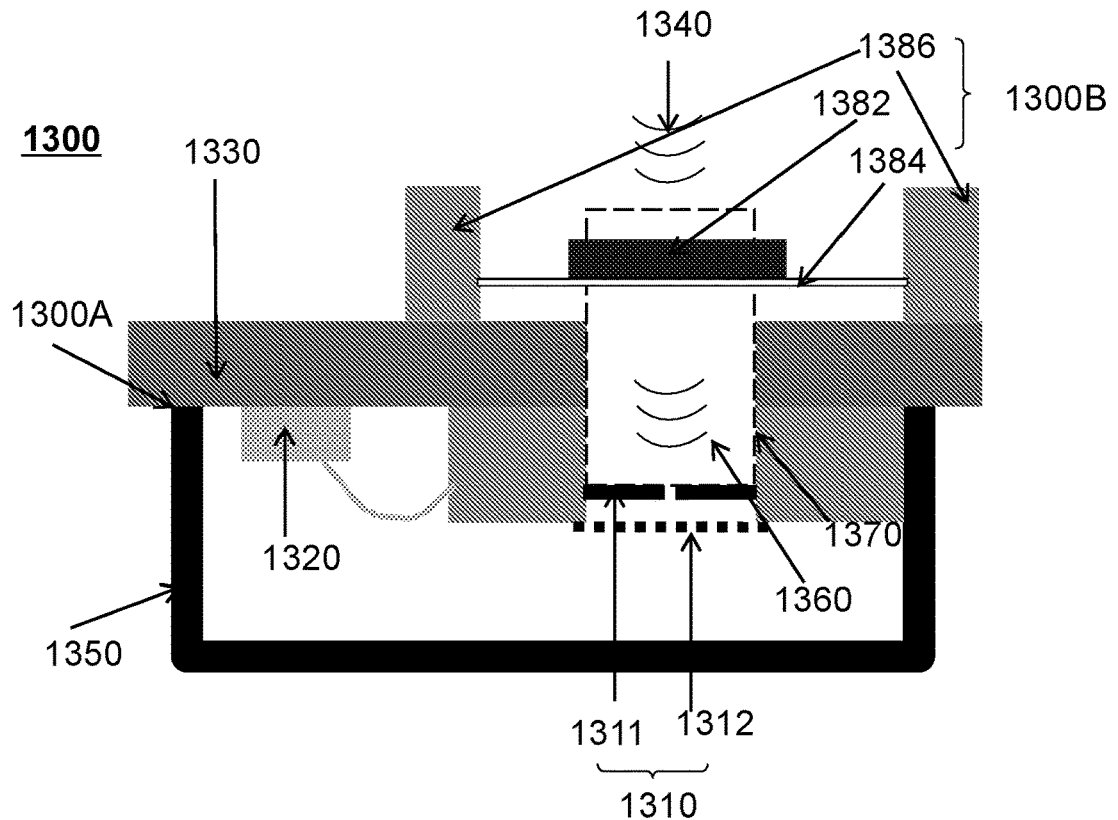
FIG. 13 is a schematic diagram illustrating a structure of an exemplary sensor device according to some embodiments of the present disclosure.
Figure 14:
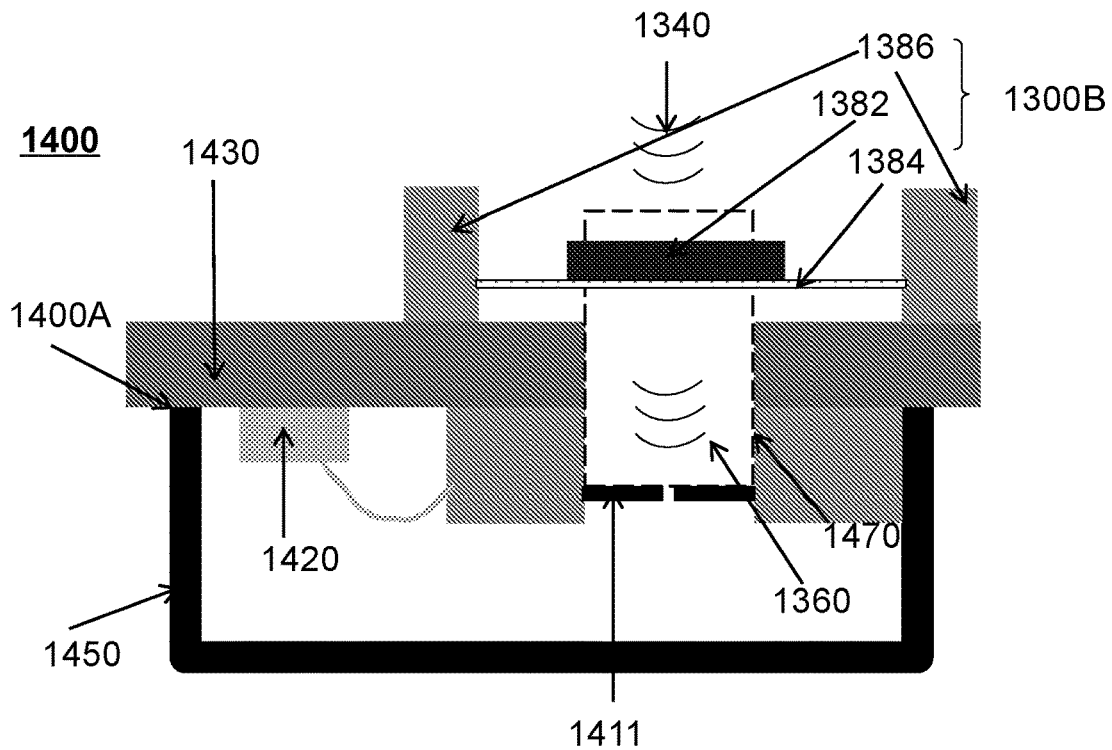
FIG. 14 is a schematic diagram illustrating a structure of an exemplary sensor device according to some embodiments of the present disclosure.

FIG. 13 is a schematic diagram illustrating a structure of an exemplary sensor device according to some embodiments of the present disclosure. FIG. 14 is a schematic diagram illustrating a structure of an exemplary sensor device according to some embodiments of the present disclosure.

As shown in FIG. 13, a sensor device 1300 may include a sensor assembly 1300A (a condenser microphone) and a sound pickup assembly 1300B. The sensor assembly 1300A may include a transducer element 1310, a processor 1320, a PCB 1330, and a housing 1350. The transducer element 1310 may include a diaphragm 1311 and a back plate 1312. The sensor assembly 1300A is the same or similar to the condenser microphone 100 shown in FIG. 1 or the sensor assembly 300A, the sensor assembly 500A, the sensor assembly 700A, the sensor assembly 900A, or the sensor assembly 1100A shown in FIG. 3, 5, 7, 9, or 11, which is not repeated here.

In some embodiments, the sensor assembly 1300A may include a sound inlet (e.g., the sound inlet 1370 shown in the dashed box, a sound inlet on the housing 1350 (not shown in FIG. 13)). The sound pickup assembly 1300B may communicate with an external sound (e.g., an air conduction sound 1340 as shown in FIG. 13) of the sensor assembly through the sound inlet. In some embodiments, an acoustic cavity 1360 is formed between the sound pickup assembly 1300B and the sensor assembly 1300A. The air conduction sound 1340 may act on the sound pickup assembly 1300B through the sound inlet, and cause the sound pickup assembly 1300B to vibrate and deform, thereby causing a sound pressure in the acoustic cavity 1360 to change. Further, the transducer element 1310 may convert the air conduction sound 1340 into an electrical signal based on a change of the sound pressure in the acoustic cavity 1360. During this process, the sensor assembly 1300A may provide the sensor device 1300 with a first resonant frequency. The sound pickup assembly 1300B may provide the sensor device 1300 with a second resonant frequency. For more descriptions about the first resonant frequency and the second resonant frequency, please refer to the above descriptions of the first resonant frequency and the second resonant frequency.

As shown in FIG. 13, the sound pickup assembly 1300B may be disposed between the transducer element 1310 and the sound inlet 1370 of the sensor assembly 1300A. For example, the sound pickup assembly 1300B may be disposed at the sound inlet 1370 and above the PCB 1330. The sound pickup assembly 1300B may include a mass block 1382, a diaphragm 1384, and a supporting component(s) 1386. The mass block 1382 and the diaphragm 1384 may form a resonant system with the aforementioned second resonant frequency. The supporting components 1386 may be fixedly connected to the PCB 1330, located on a left side and a right side of the diaphragm 1384, and fixedly connected to the diaphragm 1384. The mass block 1382 is located on an upper side of the diaphragm 1384.

As shown in FIG. 13, the mass block 1382 and the diaphragm 1384 are substantially parallel to the diaphragm 1311. The term "substantially parallel" used here means that a surface (such as an upper surface, a lower surface) of the mass block 1382 or the diaphragm 1384 is parallel to a surface (such as an upper surface, a lower surface) of the diaphragm 1311 or a deviation between the surface of the mass block 1382 or the diaphragm 1384 and the surface of the diaphragm 1311 is less than 3 degrees, 5 degrees, 8 degrees, 10 degrees, etc.

In some embodiments, by adjusting properties (such as a mass, a height, a density, a radius) of the mass block 1382, properties (such as a modulus) of the diaphragm 1384, and/or properties (such as a modulus) of the supporting component 1386, a magnitude of the second resonant frequency may be adjusted. For more descriptions about adjusting the magnitude of the second resonant frequency, please refer to the above descriptions of the sound pickup assembly including the diaphragm, the mass block, and/or the supporting component.

In some embodiments, the sound pickup assembly 1300B may further form a sensor device 1400 with a sensor assembly 1400A (a piezoelectric microphone) shown in FIG. 14. The sensor assembly 1400A may include a transducer element 1411, a processor 1420, a PCB 1430, a housing 1450, and a sound inlet 1470. The sensor assembly 1400A is the same or similar to the piezoelectric microphone 200 shown in FIG. 2 or the sensor assembly 400A, the sensor assembly 600A, the sensor assembly 800A, or the sensor assembly 1200A shown in FIG. 4, 6, 8, or 12, which is not repeated here. The sensor device 1400 is similar to the sensor device 1300 except for types of sensor assemblies. For more related descriptions, please refer to the descriptions of the sensor device 1300 in FIG. 13

Figure 15:
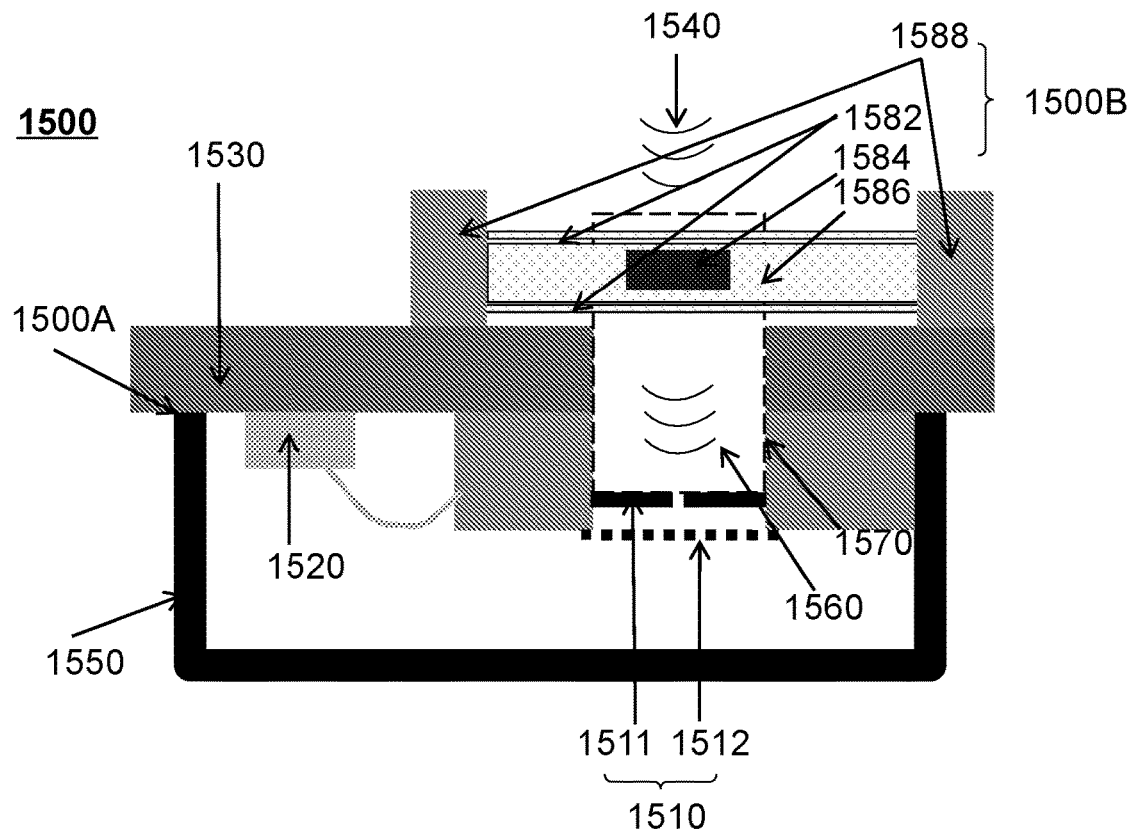
FIG. 15 is a schematic diagram illustrating a structure of an exemplary sensor device according to some embodiments of the present disclosure.
Figure 16:
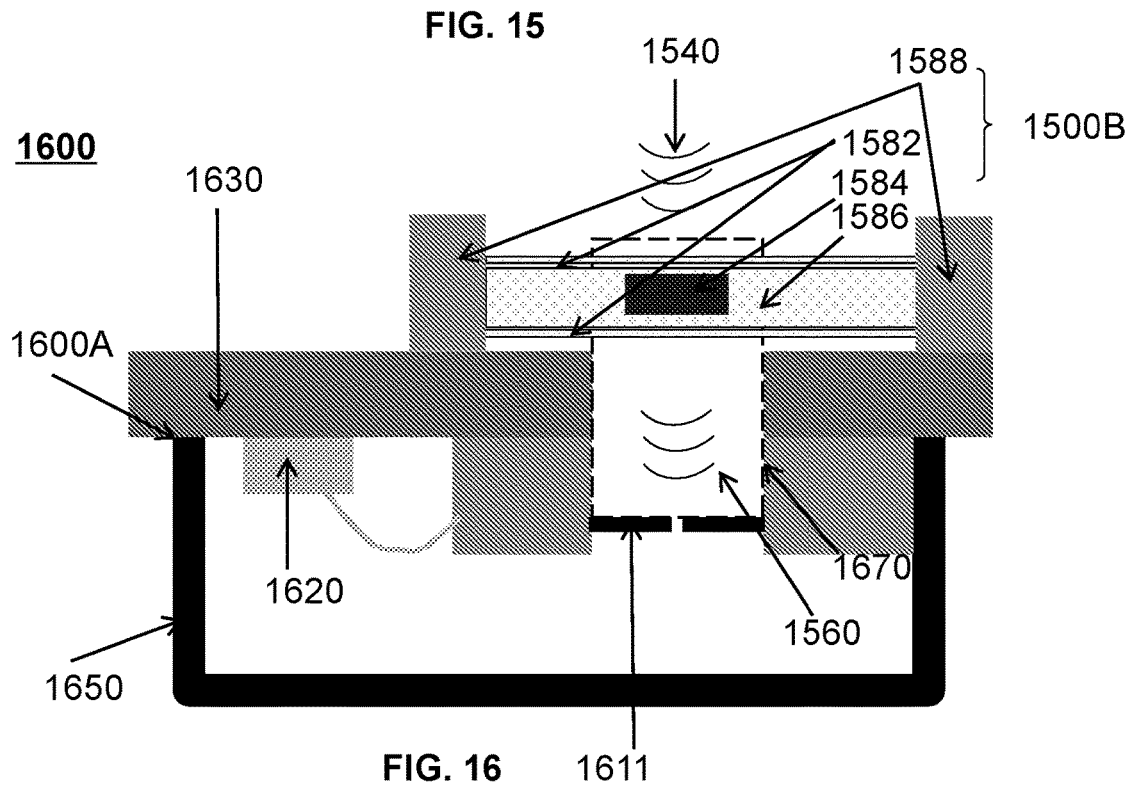
FIG. 16 is a schematic diagram illustrating a structure of an exemplary sensor device according to some embodiments of the present disclosure.

FIG. 15 is a schematic diagram illustrating a structure of an exemplary sensor device according to some embodiments of the present disclosure. FIG. 16 is a schematic diagram illustrating a structure of an exemplary sensor device according to some embodiments of the present disclosure.

As shown in FIG. 15, a sensor device 1500 may include a sensor assembly 1500A (a condenser microphone) and a sound pickup assembly 1500B. The sensor assembly 1500A may include a transducer element 1510, a processor 1520, a PCB 1530, and a housing 1550. The transducer element 1510 may include a diaphragm 1511 and a back plate 1512. The sensor assembly 1500A is the same as or similar to the condenser microphone 100 shown in FIG. 1 or the sensor assembly 300A, the sensor assembly 500A, the sensor assembly 700A, the sensor assembly 900A, the sensor assembly 1100A, or the sensor assembly 1300A shown in FIG. 3, 5, 7, 9, 11, or 13, which is not repeated here.

In some embodiments, the sensor assembly 1500A may include a sound inlet (a sound inlet 1570 shown in the dashed box, a sound inlet on the housing 1550 (not shown in FIG. 15)). The sound pickup assembly 1500B may communicate with the external sound (an air conduction sound 1540 as shown in FIG. 15) of the sensor assembly through the sound inlet. In some embodiments, an acoustic cavity 1560 is formed between the sound pickup assembly 1500B and the sensor assembly 1500A. The air conduction sound 1540 may act on the sound pickup assembly 1500B through the sound inlet, and cause the sound pickup assembly 1500B to vibrate and deform, thereby causing the sound pressure in the acoustic cavity 1560 to change. Further, the transducer element 1510 may convert the air conduction sound 1540 into an electrical signal based on a change of the sound pressure in the acoustic cavity 1560. In this process, the sensor assembly 1500A may provide the sensor device 1500 with a first resonant frequency. The sound pickup assembly 1500B may provide the sensor device 1500 with a second resonant frequency. For more descriptions of the first resonant frequency and the second resonant frequency, please refer to the above description of the first resonant frequency and the second resonant frequency.

As shown in FIG. 15, the sound pickup assembly 1500B may be disposed between the transducer element 1510 and the sound inlet 1570 of the sensor assembly 1500A. For example, the sound pickup assembly 1500B may be disposed at the sound inlet 1570 and above the PCB 1530. The sound pickup assembly 1500B may include a diaphragm(s) 1582, a mass block 1584, a liquid (or a gel, or a composition thereof) 1586, and a supporting component(s) 1588. The diaphragms 1582, the mass block 1584, and the liquid (or the gel, or the composition thereof) 1586 may form a resonant system having the aforementioned second resonant frequency. The diaphragms 1582 and the supporting components 1588 are configured to limit a movement of the liquid (or the gel, or the composition thereof) 1586 and/or the mass block 1584. The supporting components 1588 may be fixedly connected to the PCB 1530 and located on left and right sides of the liquid (or the gel, or the composition thereof) 1586 and the diaphragm 1582. The diaphragms 1582 may be located on an upper side and a lower side of the liquid (or the gel, or the composition thereof) 1586, respectively. An outside of the mass block 1584 is wrapped by the liquid (or the gel, or the composition thereof) 1586.

As shown in FIG. 15, the diaphragm 1582, the mass block 1584, or the liquid (or the gel, or the composition thereof) 1586 are substantially parallel to the diaphragm 1511. The "substantially parallel" used here means that surfaces (such as an upper surface, a lower surface) of the diaphragm 1582, the mass block 1584, or the liquid (or the gel, or the composition thereof) 1586 are parallel to a surface (such as an upper surface, a lower surface) of the diaphragm 1511, or a deviation between surfaces of diaphragm 1582, the mass block 1584, or the liquid 1586 and the surface of the diaphragm 1511 is less than 3 degrees, 5 degrees, 8 degrees, 10 degrees, etc.

In some embodiments, by adjusting properties (such as a modulus) of the diaphragm 1582, properties (such as a mass, a height, a density, a radius) of the mass block 1584, properties (such as a viscosity, a density) of the liquid (or the gel, or the composition thereof) 1586, and/or properties (such as a modulus) of the supporting component 1588, a magnitude of the second resonant frequency may be adjusted. For more descriptions about adjusting the magnitude of the second resonant frequency, please refer to the above descriptions of the sound pickup assembly including the diaphragm, the mass block, the liquid (or the gel, or the composition thereof), and/or the supporting component.

In some embodiments, the sound pickup assembly 1500B may further form a sensor device 1600 with a sensor assembly 1600A (a piezoelectric microphone) shown in FIG. 16. The sensor assembly 1600A may include a transducer element 1611, a processor 1620, a PCB 1630, and a housing 1650. The sensor assembly 1600A is the same or similar to the piezoelectric microphone 200 shown in FIG. 2 or the sensor assembly 400A, the sensor assembly 600A, the sensor assembly 800A, the sensor assembly 1200A, or the sensor assembly 1400A shown in FIG. 4, 6, 8, 12, or 14, which is not repeated here. The sensor device 1600 is similar to the sensor device 1500 except for types of sensor assemblies. For more related descriptions, please refer to the description of the sensor device 1500 in FIG. 15.

Figure 17:
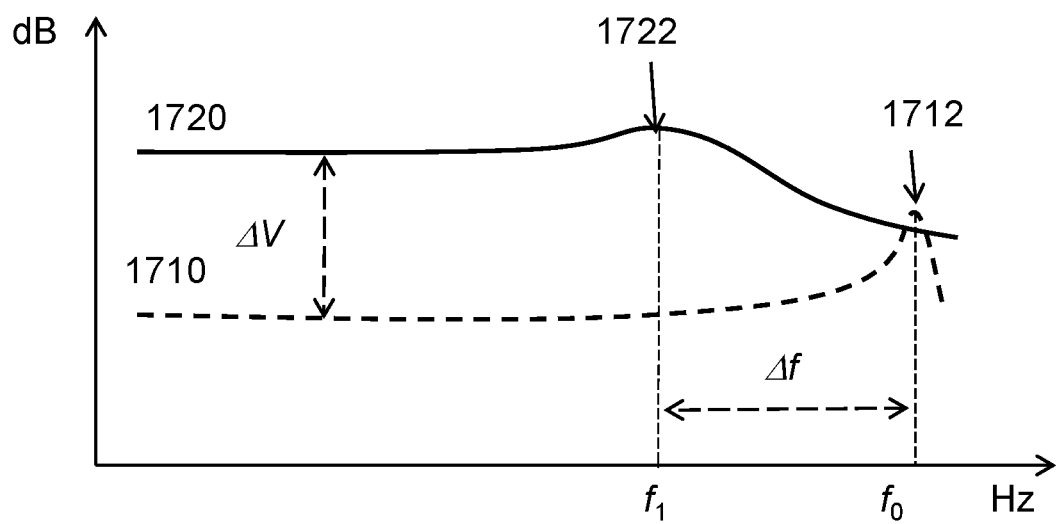
FIG. 17 is a graph illustrating frequency response curves of an exemplary sensor device according to some embodiments of the present disclosure.

FIG. 17 is a graph illustrating frequency response curves of an exemplary sensor device according to some embodiments of the present disclosure.

In some embodiments, the sensor device may include an air conduction microphone and a sound pickup assembly (such as the sound pickup assembly shown in FIGS. 3-16). As shown in FIG. 17, a frequency response curve 1710 is the frequency response curve of the air conduction microphone, and a frequency response curve 1720 is the frequency response curve of the sound pickup assembly. An abscissa of the frequency response curve 1710 or 1720 represents a frequency (Hz), and an ordinate represents a sensitivity (dB). The frequency response curve 1710 includes a resonant peak 1712 corresponding to the resonant frequency (also referred to as a first resonant frequency) ($f_0$ shown in FIG. 17) of the air conduction microphone. The frequency response curve 1720 includes a resonant peak 1722 corresponding to the resonant frequency (also referred to as a second resonant frequency) ($f_1$ shown in FIG. 17) of the sound pickup assembly. In some embodiments, a difference between the first resonant frequency and the second resonant frequency ($\Delta f$ shown in FIG. 17) is between 1000 Hz-10000 Hz.

As shown in FIG. 17, the second resonant frequency is lower than the first resonant frequency such that the sensitivity of the sensor device in a frequency range lower than the first resonant frequency, especially near the second resonant frequency, may be improved. In some embodiments, compared with the sensor device without the sound pickup assembly (e.g., the sensor device 100, the sensor device 200), the sensor device with the sound pickup assembly has a higher sensitivity in a middle and low frequency band (such as 3000 Hz-4000 Hz) which has richer voice information. For example, a sensitivity difference (Av shown in FIG. 17) between the sensor device with the sound pickup assembly and the sensor device without the sound pickup assembly is between 3 dB-30 db. As another example, the sensitivity difference (Av shown in FIG. 17) between the sensor device with the sound pickup assembly and the sensor device without the sound pickup assembly is between 3 dB-45 db. As another example, the sensitivity difference (Av shown in FIG. 17) between the sensor device with the sound pickup assembly and the sensor device without the sound pickup assembly is between 6 dB-30 db.

Figure 18:
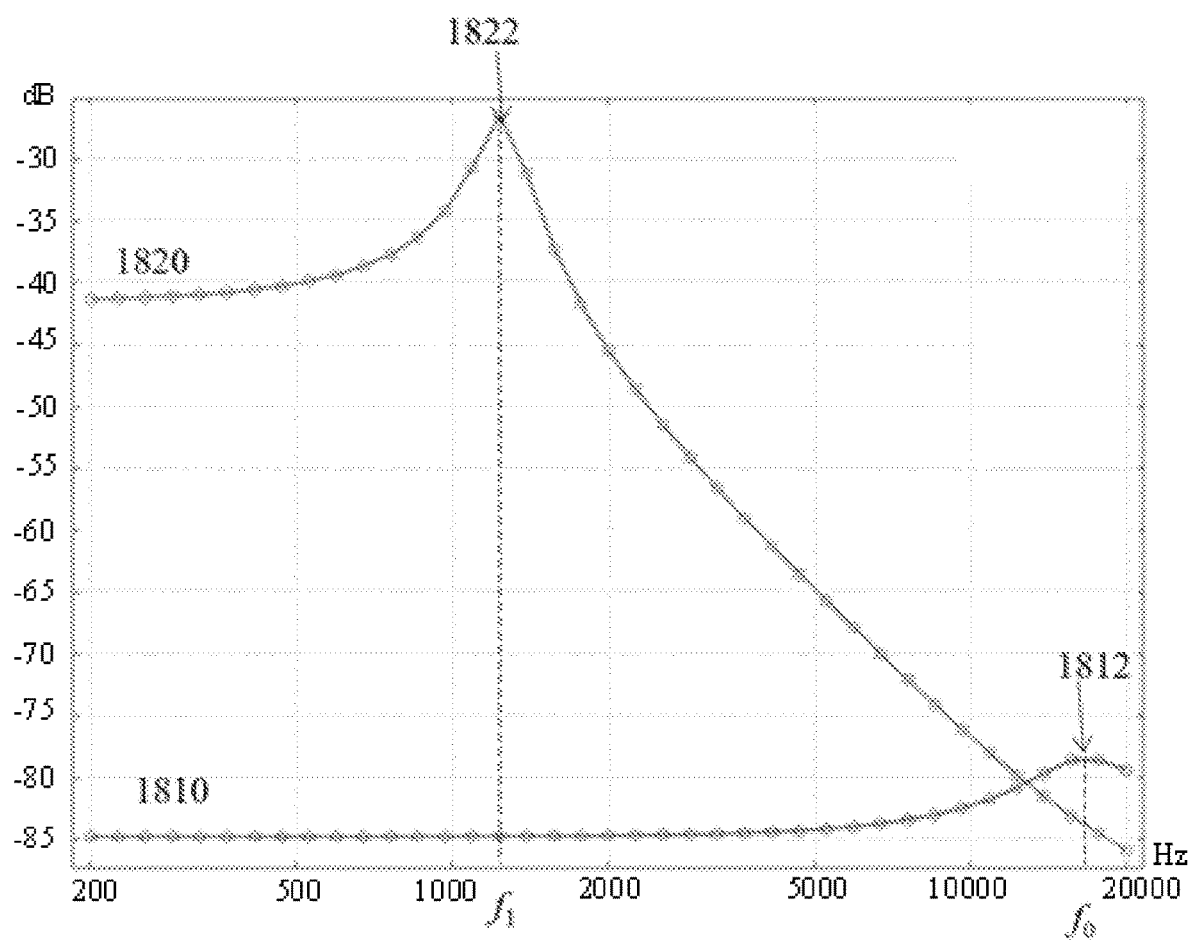
FIG. 18 is a graph illustrating frequency response curves of an exemplary sensor device according to some embodiments of the present disclosure.

FIG. 18 is a graph illustrating frequency response curves of an exemplary sensor device according to some embodiments of the present disclosure.

In some embodiments, the sensor device may include a sensor assembly (a microphone with bone conduction as a main sound transmission manner) and a sound pickup assembly (such as the sound pickup assembly as shown in FIG. 13 or 14). As shown in FIG. 18, a frequency response curve 1810 is the frequency response curve of the sensor assembly, and a frequency response curve 1820 is the frequency response curve of the sound pickup assembly. The frequency response curve 1810 includes a resonant peak 1812 corresponding to the resonant frequency (also referred to as a first resonant frequency) ($f_0$ shown in FIG. 18) of the sensor assembly. The frequency response curve 1820 includes a resonant peak 1822 corresponding to the resonant frequency (also referred to as the second resonant frequency) ($f_1$ shown in FIG. 18) of the sound pickup assembly. The second resonant frequency is lower than the first resonant frequency such that the sensitivity of the sensor assembly may be improved.

It should be noted that the frequency response curves of the sensor device (where the sensor assembly is an air conduction microphone) shown in FIG. 17 is an ideal frequency response curve. When the sensor assembly is the air conduction microphone, a change trend of an actual frequency response curve of the sensor assembly may be the same or similar to a change trend of the frequency response curve shown in FIG. 18.

The basic concept has been described above, obviously, for those skilled in the art, the above detailed disclosure is only an example and does not constitute a limitation to the present disclosure. Although not expressly stated here, those skilled in the art may make various modifications, improvements, and corrections to the present disclosure. Such modifications, improvements and corrections are suggested in the present disclosure, so they still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" mean a certain feature, structure or characteristic related to at least one embodiment of the present disclosure. Therefore, it should be emphasized and noted that two or more references to "an embodiment" or "the embodiment" or "an alternative embodiment" in different places in the present disclosure do not necessarily refer to the same embodiment. In addition, certain features, structures, or characteristics in one or more embodiments of the present disclosure may be properly combined.

In addition, unless explicitly stated in the claims, the order of processing elements and sequences described in the present disclosure, the use of numbers and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the system components described above may be implemented by hardware devices, they may also be implemented by a software-only solution, such as installing the described system on an existing server or mobile device.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings or descriptions thereof. This method of disclosure does not, however, imply that the subject matter of the present disclosure requires more features than are recited in the claims. Indeed, embodiment features are less than all features of a single foregoing disclosed embodiment.

In some embodiments, numbers describing the quantity of components and attributes are used. It should be understood that such numbers used in the description of the embodiments use the modifiers "about", "approximately" or "substantially" in some examples. Unless otherwise stated, the "about", "approximately" or "substantially" indicates that the stated figure allows for a variation of ±20%. Accordingly, in some embodiments, the numerical parameters used in the specification and claims are approximations that can vary depending upon the desired characteristics of individual embodiments. In some embodiments, numerical parameters should consider the specified significant digits and adopt the general digit reservation method. Although the numerical ranges and parameters used in some embodiments of the present disclosure to confirm the breadth of the range are approximations, in specific embodiments, such numerical values are set as precisely as practicable.

Each patent, patent application, patent application publication, and other material, such as article, book, specification, publication, document, etc., cited in the present disclosure is hereby incorporated by reference in its entirety. Application history documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of this manual and the contents of this manual, the descriptions, definitions and/or terms used in the present disclosure shall prevail.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A sensor device, comprising:
a sensor assembly with a first resonant frequency; and
a sound pickup assembly configured to communicate with an external sound of the sensor device through a sound inlet, wherein an acoustic cavity is formed between the sound pickup assembly and the sensor assembly, when the sound pickup assembly vibrates in response to an air conduction sound transmitted through the sound inlet, vibrations of the sound pickup assembly change a sound pressure in the acoustic cavity, and the sensor assembly converts the air conduction sound into an electrical signal based on changes of the sound pressure in the acoustic cavity, wherein the sound pickup assembly provides the sensor device with a second resonant frequency, and a difference between the second resonant frequency and the first resonant frequency is in a range of 1000 Hz-10000 Hz.

2. The sensor device of claim 1, wherein
the sound pickup assembly includes a liquid or a gel; and
the liquid or the gel and a gas in the acoustic cavity form a resonant system with the second resonant frequency.

3. The sensor device of claim 2, wherein
the sound pickup assembly further includes a supporting component configured to limit a movement of the liquid or the gel.

4. The sensor device of claim 3, wherein
the supporting component includes a pipe column connected to or in contact with the sensor assembly; and
the pipe column includes a straight pipe column or a curved pipe column.

5. The sensor device of claim 4, wherein a height of the pipe column is in a range of 0.1 mm-50 mm.

6. The sensor device of claim 4, wherein a diameter of the pipe column is in a range of 0.01 mm-5 mm.

7. The sensor device of claim 2, wherein a density of the liquid is 0 g/cm$^3$-3 g/cm$^3$.

8. The sensor device of claim 2, wherein a viscosity of the liquid is 1 cst-3000 cst.

9. The sensor device of claim 1, wherein
the sensor assembly includes a printed circuit board; and
the sound pickup assembly includes a diaphragm connected to the printed circuit board.

10. The sensor device of claim 9, wherein a modulus of the diaphragm is 100 MPa-300 GPa.

11. The sensor device of claim 9, wherein a modulus of the diaphragm is 5 GPa-50 GPa.

12. The sensor device of claim 9, wherein
the sensor assembly includes a second diaphragm; and
a modulus of the diaphragm is 1/100-1/10 of a modulus of the second diaphragm.

13. The sensor device of claim 9, wherein
the diaphragm is circular; and
a radius of the diaphragm is 500 um-3 mm.

14. The sensor device of claim 1, wherein
the sound pickup assembly includes a diaphragm, a liquid, and a supporting component, or includes the diaphragm, a gel, and the supporting component;
the liquid and the diaphragm form a resonant system with the second resonant frequency, or the gel and the diaphragm form the resonant system with the second resonant frequency; and
the diaphragm and the supporting component are configured to limit a movement of the liquid or the gel.

15. The sensor device of claim 1, wherein
the sound pickup assembly includes a diaphragm and a liquid, or includes the diaphragm and a gel; and the liquid and the diaphragm form a resonant system with the second resonant frequency, or the gel and the diaphragm form the resonant system with the second resonant frequency.

16. The sensor device of claim 1, wherein the sound pickup assembly includes a diaphragm, a liquid, a supporting component, and a mass block, or includes the diaphragm, a gel, the supporting component, and the mass block;

the liquid, the diaphragm, and the mass block form a resonant system with the second resonant frequency, or the gel, the diaphragm, and the mass block form the resonant system with the second resonant frequency;

the diaphragm and the supporting component are configured to limit a movement of the liquid or the gel; and the mass block is placed in the liquid or the gel.

17. The sensor device of claim 1, wherein the sound pickup assembly includes a diaphragm, a supporting component, and a mass block;

the diaphragm and the mass block form a resonant system with the second resonant frequency; and the supporting component is configured to support the diaphragm and the mass block.

18. The sensor device of claim 1, wherein the second resonant frequency is lower than the first resonant frequency.

19. The sensor device of claim 18, wherein a difference between the first resonant frequency and the second resonant frequency is in a range of 1000 Hz-10000 Hz.

20. The sensor device of claim 1, wherein the second resonant frequency is 2000 Hz-10000 Hz.

\* \* \* \* \*